US011827755B2

(12) United States Patent
Alli et al.

(10) Patent No.: US 11,827,755 B2
(45) Date of Patent: Nov. 28, 2023

(54) SILICONE HYDROGEL CONTACT LENSES HAVING NON-UNIFORM MORPHOLOGY

(71) Applicant: Johnson & Johnson Vision Care, Inc., Jacksonville, FL (US)

(72) Inventors: Azaam Alli, Jacksonville, FL (US); Donald E. Riederer, Jacksonville, FL (US); Alexander Guzman, Jacksonville, FL (US); Bernardo Santa Maria, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 18/065,206

(22) Filed: Dec. 13, 2022

(65) Prior Publication Data
US 2023/0116533 A1 Apr. 13, 2023

Related U.S. Application Data

(62) Division of application No. 16/875,164, filed on May 15, 2020, now Pat. No. 11,578,176.
(Continued)

(51) Int. Cl.
*C08J 3/075* (2006.01)
*C08L 83/04* (2006.01)
(Continued)

(52) U.S. Cl.
CPC ........... *C08J 3/075* (2013.01); *C08F 230/085* (2020.02); *C08L 83/04* (2013.01); *G02B 1/043* (2013.01);
(Continued)

(58) Field of Classification Search
CPC .. C08F 230/08; C08F 220/54; C08F 230/085; C08F 220/20; C08F 220/36; C08F 222/102; C08F 220/387
See application file for complete search history.

(56) References Cited

U.S. PATENT DOCUMENTS

| 3,808,178 A | 4/1974 | Gaylord |
| 4,120,570 A | 10/1978 | Gaylord |

(Continued)

FOREIGN PATENT DOCUMENTS

| EP | 0080539 B1 | 5/1986 |
| WO | 2003022321 A2 | 3/2003 |
| WO | 2008061992 A2 | 5/2008 |

OTHER PUBLICATIONS

"Compendium of Polymer Terminology and Nomenclature: IUPAC Recommendations", edited by: Richard G. Jones, Jaroslav Kahovec, Robert Stepto, Edward S. Wilks, Michael Hess, Tatsuki Kitayama, and W. Val Metanomski, 2008.
(Continued)

*Primary Examiner* — Peter A Salamon
(74) *Attorney, Agent, or Firm* — Raef M. Shaltout

(57) ABSTRACT

Described is a silicone hydrogel contact lens having non-uniform morphology. The contact lens may be made from a reactive mixture comprising: a silicone-containing component; a hydrophilic component; a non-reactive polymeric internal wetting agent; and a polymerization initiator, the contact lens having an oxygen permeability of at least about 60 barrers, and wherein the molar ratio in the lens of the polymeric non-reactive internal wetting agent to silicone, without a surface treatment, is greater in the lens's surface than in its bulk.

12 Claims, 2 Drawing Sheets

FTIR Spectra showing PVP Surface and Bulk Concentrations using PVP/Silicone Ratios

Related U.S. Application Data

(60) Provisional application No. 62/865,586, filed on Jun. 24, 2019.

(51) Int. Cl.
    *C08F 230/08* (2006.01)
    *G02B 1/04* (2006.01)

(52) U.S. Cl.
    CPC ........ *C08J 2383/04* (2013.01); *C08J 2439/00* (2013.01); *C08J 2443/04* (2013.01); *C08L 2203/02* (2013.01)

(56) References Cited

U.S. PATENT DOCUMENTS

| | | |
|---|---|---|
| 4,136,250 A | 1/1979 | Mueller et al. |
| 4,153,641 A | 5/1979 | Deichert et al. |
| 4,436,887 A | 3/1984 | Chromecek et al. |
| 4,495,313 A | 1/1985 | Larsen |
| 4,659,782 A | 4/1987 | Spinelli |
| 4,659,783 A | 4/1987 | Spinelli |
| 4,740,533 A | 4/1988 | Su et al. |
| 4,889,664 A | 12/1989 | Kindt-larsen et al. |
| 4,910,277 A | 3/1990 | Bambury et al. |
| 5,006,622 A | 4/1991 | Kunzler et al. |
| 5,034,461 A | 7/1991 | Lai et al. |
| 5,039,459 A | 8/1991 | Kindt-larsen et al. |
| 5,070,215 A | 12/1991 | Bambury et al. |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |
| 5,314,960 A | 5/1994 | Spinelli et al. |
| 5,331,067 A | 7/1994 | Seidner et al. |
| 5,371,147 A | 12/1994 | Spinelli et al. |
| 5,824,719 A | 10/1998 | Kunzler et al. |
| 5,944,853 A | 8/1999 | Molock et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,020,445 A | 2/2000 | Vanderlaan et al. |
| 6,087,415 A | 7/2000 | Vanderlaan et al. |
| 6,099,852 A | 8/2000 | Jen |
| 5,760,100 B1 | 11/2000 | Nicolson et al. |
| 5,776,999 B1 | 11/2000 | Nicolson et al. |
| 5,789,461 B1 | 11/2000 | Nicolson et al. |
| 5,849,811 B1 | 11/2000 | Nicolson et al. |
| 6,367,929 B1 | 4/2002 | Maiden et al. |
| 6,420,453 B1 | 7/2002 | Bowers et al. |
| 6,423,761 B1 | 7/2002 | Bowers et al. |
| 6,478,423 B1 | 11/2002 | Turner et al. |
| 6,500,481 B1 | 12/2002 | Vanderlaan et al. |
| 6,534,559 B1 | 3/2003 | Vanderlaan et al. |
| 6,689,480 B2 | 2/2004 | Shimoyama et al. |
| 6,767,979 B1 | 7/2004 | Muir et al. |
| 6,815,074 B2 | 11/2004 | Aguado et al. |
| 6,822,016 B2 | 11/2004 | McCabe et al. |
| 6,838,491 B1 | 1/2005 | Vanderlaan et al. |
| 6,867,245 B2 | 3/2005 | Iwata et al. |
| 6,926,965 B2 | 8/2005 | Qiu et al. |
| 6,940,580 B2 | 9/2005 | Winterton et al. |
| 6,943,203 B2 | 9/2005 | Vanderlaan et al. |
| 6,951,894 B1 | 10/2005 | Nicolson et al. |
| 7,052,131 B2 | 5/2006 | McCabe et al. |
| 7,247,692 B2 | 7/2007 | Laredo |
| 7,249,848 B2 | 7/2007 | Laredo et al. |
| 7,396,890 B2 | 7/2008 | Zanini et al. |
| 7,461,937 B2 | 12/2008 | Steffen et al. |
| 7,468,398 B2 | 12/2008 | Nicolson et al. |
| 7,538,146 B2 | 5/2009 | Nicolson et al. |
| 7,553,880 B2 | 6/2009 | Nicolson et al. |
| 7,572,841 B2 | 8/2009 | Chen et al. |
| 7,666,921 B2 | 2/2010 | McCabe et al. |
| 7,691,916 B2 | 4/2010 | McCabe et al. |
| 7,786,185 B2 | 8/2010 | Rathore et al. |
| 7,825,170 B2 | 11/2010 | Steffen et al. |
| 7,879,267 B2 | 2/2011 | Turner et al. |
| 7,915,323 B2 | 3/2011 | Awasthi et al. |
| 7,934,830 B2 | 5/2011 | Blackwell et al. |
| 7,956,131 B2 | 6/2011 | Arnold et al. |
| 7,994,356 B2 | 8/2011 | Awasthi et al. |
| 8,022,158 B2 | 9/2011 | Rathore et al. |
| 8,138,290 B2 | 3/2012 | Blackwell et al. |
| 8,163,206 B2 | 4/2012 | Chang et al. |
| 8,273,802 B2 | 9/2012 | Laredo et al. |
| 8,389,597 B2 | 3/2013 | Blackwell et al. |
| 8,399,538 B2 | 3/2013 | Steffen et al. |
| 8,415,404 B2 | 4/2013 | Nicolson et al. |
| 8,420,711 B2 | 4/2013 | Awasthi et al. |
| 8,450,387 B2 | 5/2013 | McCabe et al. |
| 8,470,906 B2 | 6/2013 | Rathore et al. |
| 8,487,058 B2 | 7/2013 | Liu et al. |
| 8,507,577 B2 | 8/2013 | Zanini et al. |
| 8,568,626 B2 | 10/2013 | Nicolson et al. |
| 8,637,621 B2 | 1/2014 | Iwata et al. |
| 8,703,891 B2 | 4/2014 | Broad |
| 8,937,110 B2 | 1/2015 | Alli et al. |
| 8,937,111 B2 | 1/2015 | Alli et al. |
| 8,940,812 B2 | 1/2015 | Reboul et al. |
| 8,980,972 B2 | 3/2015 | Driver |
| 9,056,878 B2 | 6/2015 | Fujisawa et al. |
| 9,057,821 B2 | 6/2015 | Broad et al. |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,217,813 B2 | 12/2015 | Liu et al. |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 2007/0229758 A1 | 10/2007 | Matsuzawa |
| 2008/0003259 A1 | 1/2008 | Salamone et al. |
| 2008/0174035 A1 | 7/2008 | Winterton |
| 2009/0200692 A1 | 8/2009 | Chang |
| 2009/0295004 A1 | 12/2009 | Pinsly et al. |
| 2012/0074352 A1 | 3/2012 | Matsunaga et al. |
| 2018/0037690 A1 | 2/2018 | Aitken et al. |
| 2020/0284951 A1 | 9/2020 | Chauhan et al. |

OTHER PUBLICATIONS

Encyclopedia of Polymer Science and Engineering, N-Vinyl Amide Polymers, Seocund Edition, Encyclopedia of polymer Science and Engineering, Second edition, pp. 198-257, vol. 17.
ISO 18369-4, "Ophthalmic Optics—Contact Lenses—Part 4: Physicochemical Properties of Contact Lens Materials", In International Organization for Standardization, 38 Pages, Aug. 15, 2006.
ISO 9913-1, "Optics and Optical Instruments—Contact Lenses—Part 1: Determination of Oxygen Permeability and Transmissibility by the FATT Method", In International Organization for Standardization, 16 Pages, Nov. 1, 1996.
Jones, et al., "Surface treatment, wetting and modulus of silicone hydrogels", Optician, Sep. 1, 2006, pp. 28-34, vol. 232, Issue 6067.
PCT International Preliminary Report on Patentability, dated Dec. 28, 2021, for PCT Int'l Appln. No. PCT/IB2020/055282, 9 Pages.
PCT International Search Report, dated Jul. 8, 2020, for PCT Int'l Appln. No. PCT/IB2020/055282, 10 Pages.
"PVP-Polyvinylpyrrolidone polymers", Ashland, 16 pages, Nov. 9, 2022.
ISO-10344:1996(E), "Optics and optical instruments—Contact lenses—Saline solution for contact lens testing", 8 pages, 1996.

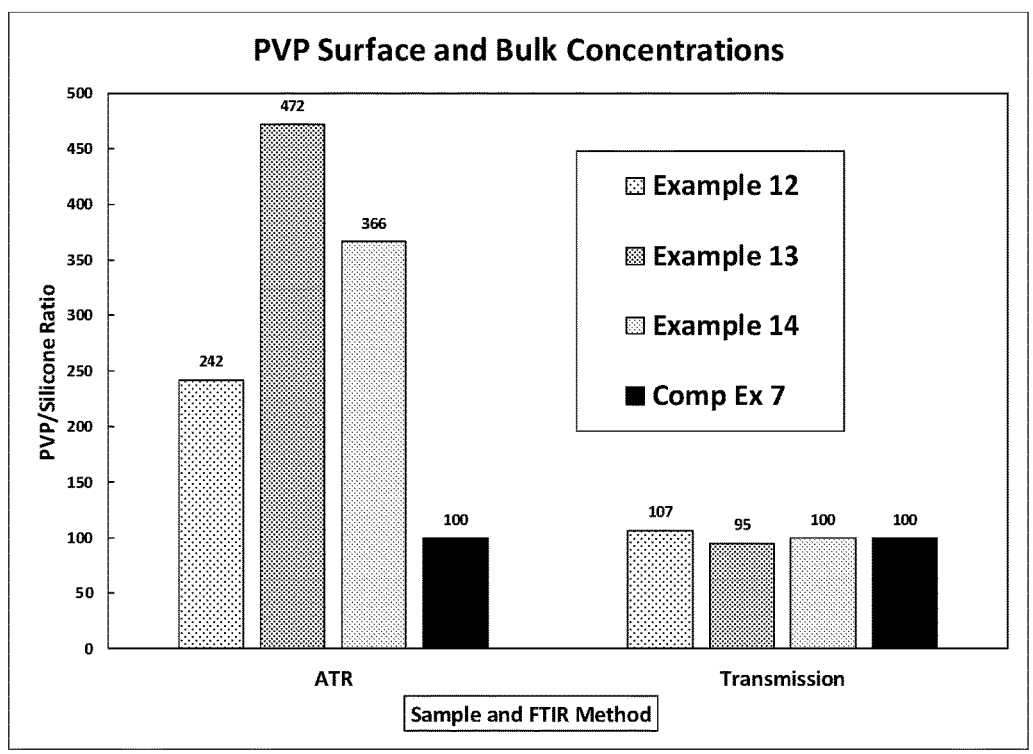
FIG. 1. FTIR Spectra showing PVP Surface and Bulk Concentrations using PVP/Silicone Ratios

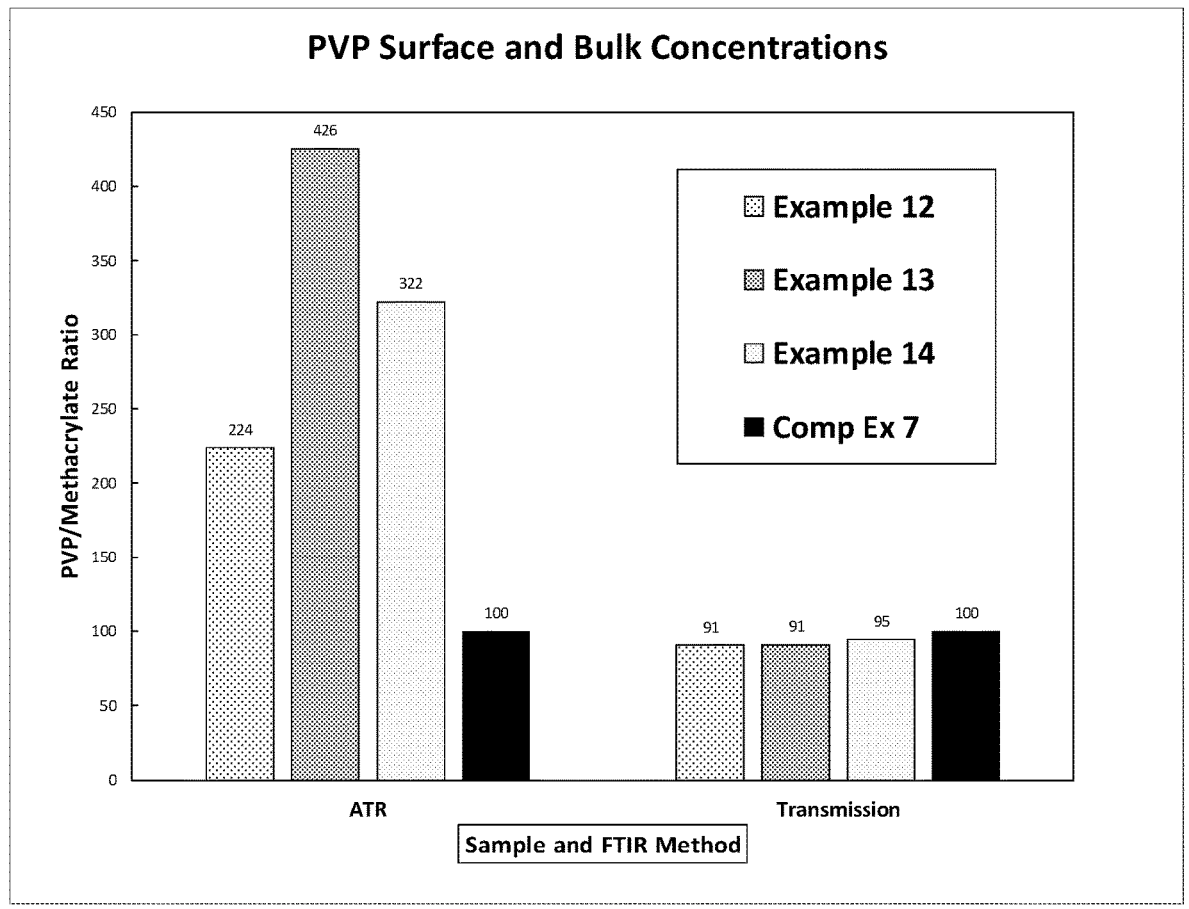
FIG. 2. FTIR Spectra showing PVP Surface and Bulk Concentrations using the PVP/Methacrylate Ratios

SILICONE HYDROGEL CONTACT LENSES HAVING NON-UNIFORM MORPHOLOGY

RELATED APPLICATIONS

This application is a divisional of U.S. patent application Ser. No. 16/875,164, filed May 15, 2020, which claims priority to U.S. Provisional Patent Application Ser. No. 62/865,586, filed Jun. 24, 2019, which is incorporated herein by reference in its entirety.

FIELD OF THE INVENTION

The invention relates to a silicone hydrogel contact lens having non-uniform morphology. More specifically, the invention relates to a silicone hydrogel contact lens containing a non-reactive polymeric internal wetting agent wherein the non-reactive polymeric internal wetting agent is more concentrated in the lens's surface than in its bulk.

BACKGROUND OF THE INVENTION

Soft contact lenses are based upon hydrogels. Many users find soft contact lenses comfortable enough to wear all day. There are two main classes of soft contact lens materials: conventional soft contact lenses, which are formed from hydrogels containing no silicone, and silicone hydrogels.

Silicone hydrogels are water-swollen polymer networks that have high oxygen permeability. One of the challenges of silicone hydrogel is the inherent hydrophobicity of the lens surface, which reduces their compatibility with the eye. Many strategies have been employed to address this hydrophobic character. Some techniques rely on modification of the lens surface after manufacture in order to add hydrophilicity, such as by application of a hydrophilic surface coating. Other techniques rely on the inclusion of an internal wetting agent in the lens. An advantage of this latter approach is that post manufacture surface modification is not required. A disadvantage is that the hydrophilic wetting agent is often not readily compatible with the hydrophobic constituents of the monomer mixture (such as the silicone components), which consequently requires the use of compatiblizing materials, thus adding complexity and cost to the formulation.

A common wetting agent that has been used to impart hydrophilicity to a silicone hydrogel contact lens is polyvinylpyrrolidone (PVP). In a typical manufacturing procedure, the PVP is included in a reactive monomer mixture containing a photoinitiator and other reactive components, which is then subjected to ultraviolet or visible light initiated curing (photochemical curing). The resulting product contains the PVP uniformly distributed throughout the lens.

One of the main benefits of the PVP is its impact on the surface properties of the lens, such as surface wettability. Thus, while the PVP is uniformly distributed through the lens, it is typically present at sufficient concentration that it still improves the lens surface.

Silicone hydrogel contact lenses have experienced widespread success in the industry. These lenses provide high oxygen permeability as well as a good level of comfort to many lens wearers. Nevertheless, there are some users who still experience discomfort and excessive ocular deposits leading to reduced visual acuity when using these lenses, in particular during extended periods of wear such as for several days in a row, for example, up to about 30 days. Such discomfort and deposits have been attributed to the hydrophobic character discussed above, and the interaction of those surfaces with the protein, lipids and mucin and the hydrophilic surface of the eye. Thus, it would be an advantage in the field to develop new silicone hydrogel contact lenses with further improved surface properties.

SUMMARY OF THE INVENTION

The invention relates to a silicone hydrogel contact lens containing a non-reactive polymeric internal wetting agent, wherein the wetting agent is enriched at the surface of the lens, relative to the bulk. Such lenses provide more efficient use of the wetting agent by positioning the agent where it is needed. A number of benefits consequently result including, for instance, better surface wettability at substantially the same overall wetting agent concentration as existing lenses. Or surface enriched lenses may provide the option to use less wetting agent to achieve substantially the same wettability as existing lenses, which may in turn simplify the manufacturing process and/or reduce costs.

Accordingly, in one aspect, the invention provides a silicone hydrogel contact lens that is a reaction product of a reactive mixture comprising: a silicone-containing component; a hydrophilic component; a non-reactive polymeric internal wetting agent; and a polymerization initiator, the contact lens having an oxygen permeability of at least about 60 barrers, and wherein the molar ratio in the lens of the polymeric non-reactive internal wetting agent to silicone, without a surface treatment, is greater in the lens's surface than in its bulk.

In another aspect, the invention provides a method for manufacturing a contact lens. The method comprises: (a) providing a reactive mixture comprising a silicone-containing component; a hydrophilic component; a non-reactive polymeric internal wetting agent; and a polymerization initiator; and (b) polymerizing the reactive mixture to form the contact lens, wherein the method is conducted under conditions such that the contact lens has a molar ratio of the polymeric non-reactive internal wetting agent to silicone, without a surface treatment, that is greater in the lens's surface than in its bulk.

BRIEF DESCRIPTION OF FIGURES

FIG. 1 shows FTIR spectra showing PVP surface and bulk concentrations using PVP/silicone ratios for inventive and comparative contact lenses.

FIG. 2 shows FTIR Spectra showing PVP surface and bulk concentrations using PVP/methacrylate ratios for inventive and comparative contact lenses.

DETAILED DESCRIPTION OF THE INVENTION

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [***]$_n$, is used to depict the number of repeating units in a polymer's chemical formula, the formula should be interpreted to represent the number average molecular weight of the macromolecule.

The term "individual" includes humans and vertebrates.

The term "ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

"Target macromolecule" means the macromolecule being synthesized from the reactive monomer mixture comprising monomers, macromers, prepolymers, cross-linkers, initiators, additives, diluents, and the like.

The term "polymerizable compound" or "polymerizable component" means a compound containing one or more polymerizable groups. The term encompasses, for instance, monomers, macromers, oligomers, prepolymers, cross-linkers, and the like.

"Polymerizable groups" are groups that can undergo chain growth polymerization, such as free radical and/or cationic polymerization, for example a carbon-carbon double bond which can polymerize when subjected to radical polymerization initiation conditions. Non-limiting examples of free radical polymerizable groups include (meth)acrylates, styrenes, vinyl ethers, (meth)acrylamides, N-vinyllactams, N-vinylamides, O-vinylcarbamates, O-vinylcarbonates, and other vinyl groups. Preferably, the free radical polymerizable groups comprise (meth)acrylate, (meth)acrylamide, N-vinyl lactam, N-vinylamide, and styryl functional groups, and mixtures of any of the foregoing. More preferably, the free radical polymerizable groups comprise (meth)acrylates, (meth)acrylamides, and mixtures thereof. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted).

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

A "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent. A "hydrophobic component" is a monomer, macromer, prepolymer, initiator, cross-linker, additive, or polymer which is slightly soluble or insoluble in deionized water at 25° C.

A "macromolecule" is an organic compound having a number average molecular weight of greater than 1500, and may be reactive or non-reactive.

A "macromonomer" or "macromer" is a macromolecule that has one group that can undergo chain growth polymerization, and in particular, free radical polymerization, thereby creating a repeating unit in the chemical structure of the target macromolecule. Typically, the chemical structure of the macromer is different than the chemical structure of the target macromolecule, that is, the repeating unit of the macromer's pendent group is different than the repeating unit of the target macromolecule or its mainchain. The difference between a monomer and a macromer is merely one of chemical structure, molecular weight, and molecular weight distribution of the pendent group. As a result, and as used herein, the patent literature occasionally defines monomers as polymerizable compounds having relatively low molecular weights of about 1,500 Daltons or less, which inherently includes some macromers. In particular, monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) may be referred to as monomers or macromers. Furthermore, the patent literature occasionally defines macromers as having one or more polymerizable groups, essentially broadening the common definition of macromer to include prepolymers. As a result and as used herein, di-functional and multi-functional macromers, prepolymers, and crosslinkers may be used interchangeably.

A "silicone-containing component" is a monomer, macromer, prepolymer, cross-linker, initiator, additive, or polymer in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers used during polymerization.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-azobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "cross-linking agent" is a di-functional or multi-functional monomer or macromer which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers which contains remaining polymerizable groups capable of undergoing further reaction to form a polymer.

A "polymeric network" is a cross-linked macromolecule that may swell but cannot dissolve in solvents. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N, N-dimethylacrylamide ("DMA") or vinyl acetate. U.S. Pat. Nos. 4,436,887, 4,495, 313, 4,889,664, 5,006,622, 5,039,459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

An "interpenetrating polymeric network" comprises two or more networks which are at least partially interlaced on the molecular scale but not covalently bonded to each other and which cannot be separated without braking chemical bonds. A "semi-interpenetrating polymeric network" comprises one or more networks and one or more polymers characterized by some mixing on the molecular level between at least one network and at least one polymer. A mixture of different polymers is a "polymer blend." A semi-interpenetrating network is technically a polymer blend, but in some cases, the polymers are so entangled that they cannot be readily removed.

"Reactive components" are the polymerizable compounds (such as monomers, macromers, oligomers, prepolymers, and cross-linkers) in the reactive mixture (defined below), as well as any other components in the reactive mixture which are intended to substantially remain in the polymeric network after polymerization and all work-up steps (such as extraction steps) and packaging steps have been completed. Reactive components may be retained in the polymeric network by covalent bonding, hydrogen bonding, electrostatic interactions, the formation of interpenetrating polymeric networks, or any other means. Components that are intended to release from the polymeric network once it is in use are still considered "reactive components." For example, pharmaceutical or nutraceutical components in a contact lens which are intended to be released during wear are considered "reactive components." Components that are intended to be removed from the polymeric network during the manufacturing process (e.g., by extraction), such as diluents, are not "reactive components."

The terms "reactive mixture" and "reactive monomer mixture" refer to the mixture of components which are mixed together and, when subjected to polymerization conditions, result in formation of a polymeric network (such as conventional or silicone hydrogels) as well as biomedical devices, ophthalmic devices, and contact lenses made therefrom. The reactive mixture may comprise reactive components such as monomers, macromers, prepolymers, cross-linkers, and initiators, additives such as wetting agents, polymers, dyes, light absorbing compounds such as UV absorbers, pigments, photochromic compounds, pharmaceutical compounds, and/or nutraceutical compounds, any of which may be polymerizable or non-polymerizable but are capable of being retained within the resulting biomedical device (e.g., contact lens). The reactive mixture may also contain other components which are intended to be removed from the device prior to its use, such as diluents. It will be appreciated that a wide range of additives may be added based upon the contact lens which is made and its intended use. Concentrations of components of the reactive mixture are expressed as weight percentages of all reactive components in the reactive mixture, therefore excluding diluents. When diluents are used, their concentrations are expressed as weight percentages based upon the amount of all components in the reactive mixture (including the diluent).

The term "silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer content to transmit oxygen to the eye.

The term "multi-functional" refers to a component having two or more polymerizable groups. The term "mono-functional" refers to a component having one polymerizable group.

The terms "halogen" or "halo" indicate fluorine, chlorine, bromine, and iodine.

"Alkyl" refers to an optionally substituted linear or branched alkyl group containing the indicated number of carbon atoms. If no number is indicated, then alkyl (including any optional substituents on alkyl) may contain 1 to 16 carbon atoms. Preferably, the alkyl group contains 1 to 10 carbon atoms, alternatively 1 to 8 carbon atoms, alternatively 1 to 6 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, thioalkyl, carbamate, carbonate, halogen, phenyl, benzyl, and combinations thereof. "Alkylene" means a divalent alkyl group, such as —$CH_2$—, —$CH_2CH_2$—, —$CH_2CH_2CH_2$—, —$CH_2CH(CH_3)CH_2$—, and —$CH_2CH_2CH_2CH_2$—.

"Haloalkyl" refers to an alkyl group as defined above substituted with one or more halogen atoms, where each halogen is independently F, Cl, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as —$CF_3$— or —$CF_2CF_3$—. "Haloalkylene" means a divalent haloalkyl group, such as —$CH_2CF_2$—.

"Cycloalkyl" refers to an optionally substituted cyclic hydrocarbon containing the indicated number of ring carbon atoms. If no number is indicated, then cycloalkyl may contain 3 to 12 ring carbon atoms. Preferred are $C_3$-$C_8$ cycloalkyl groups, $C_3$-$C_7$ cycloalkyl, more preferably $C_4$-$C_7$ cycloalkyl, and still more preferably $C_5$-$C_6$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, thioalkyl, amido, carbamate, carbonate, halo, phenyl, benzyl, and combinations thereof. "Cycloalkylene" means a divalent cycloalkyl group, such as 1,2-cyclohexylene, 1,3-cyclohexylene, or 1,4-cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an optionally substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, thioalkyl, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Thioalkyl" means an alkyl group attached to the parent molecule through a sulfur bridge. Examples of thioalkyl groups include, for instance, methylthio, ethylthio, n-propylthio and iso-propylthio. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as —$CH_2CH_2NH$—.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., —[Si—O]$_n$—, where n is 2 or more). Each silicon atom in the siloxanyl group is substituted with independently selected $R^A$ groups (where $R^A$ is as defined in formula A options (b)-(i)) to complete their valence.

"Silyl" refers to a structure of formula $R_3Si$— and "siloxy" refers to a structure of formula $R_3Si$—O—, where each R in silyl or siloxy is independently selected from trimethylsiloxy, $C_1$-$C_8$ alkyl (preferably $C_1$-$C_3$ alkyl, more preferably ethyl or methyl), and $C_3$-$C_8$ cycloalkyl.

"Alkyleneoxy" refers to groups of the general formula -(alkylene-O)$_p$— or —(O-alkylene)$_p$-, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., HO—[CH$_2$CH$_2$O]$_p$— or CH$_3$O—[CH$_2$CH$_2$O]$_p$—). Examples of alkyleneoxy include polyethyleneoxy, polypropyleneoxy, polybutyleneoxy, and poly(ethyleneoxy-co-propyleneoxy).

"Oxaalkylene" refers to an alkylene group as defined above where one or more non-adjacent CH$_2$ groups have been substituted with an oxygen atom, such as —CH$_2$CH$_2$OCH(CH$_3$)CH$_2$—. "Thiaalkylene" refers to an alkylene group as defined above where one or more non-adjacent CH$_2$ groups have been substituted with a sulfur atom, such as —CH$_2$CH$_2$SCH(CH$_3$)CH$_2$—.

The term "linking group" refers to a moiety that links a polymerizable group to the parent molecule. The linking group may be any moiety that is compatible with the compound of which it is a part, and that does not undesirably interfere with the polymerization of the compound, is stable under the polymerization conditions as well as the conditions for the processing and storage of the final product. For instance, the linking group may be a bond, or it may comprise one or more alkylene, haloalkylene, amide, amine, alkyleneamine, carbamate, ester (—CO$_2$—), arylene, heteroarylene, cycloalkylene, heterocycloalkylene, alkyleneoxy, oxaalkylene, thiaalkylene, haloalkyleneoxy (alkyleneoxy substituted with one or more halo groups, e.g., —OCF$_2$—, —OCF$_2$CF$_2$—, —OCF$_2$CH$_2$—), siloxanyl, alkylenesiloxanyl, or combinations thereof. The linking group may optionally be substituted with 1 or more substituent groups. Suitable substituent groups may include those independently selected from alkyl, halo (e.g., fluoro), hydroxyl, HO-alkyleneoxy, MeO-alkyleneoxy, siloxanyl, siloxy, siloxy-alkyleneoxy-, siloxy-alkylene-alkyleneoxy- (where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate (in addition to the polymerizable group to which the linking group is linked).

Preferred linking groups include C$_1$-C$_8$ alkylene (preferably C$_2$-C$_6$ alkylene) and C$_1$-C$_8$ oxaalkylene (preferably C$_2$-C$_6$ oxaalkylene), each of which is optionally substituted with 1 or 2 groups independently selected from hydroxyl and siloxy. Preferred linking groups also include carboxylate, amide, C$_1$-C$_8$ alkylene-carboxylate-C$_1$-C$_8$ alkylene, or C$_1$-C$_8$ alkylene-amide-C$_1$-C$_8$ alkylene.

When the linking group is comprised of combinations of moieties as described above (e.g., alkylene and cycloalkylene), the moieties may be present in any order. For instance, if in Formula A below, L is indicated as being -alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg or Pg) to which the linking group is attached. For example, if in Formula A, L is indicated as being alkylene-cycloalkylene, then Rg-L is preferably Rg-alkylene-cycloalkylene-.

The phrase "without a surface treatment" or "not surface treated" means that the enrichment of the non-reactive polymeric internal wetting agent at the surface, as well as the improved surface wettability, of the lens of the invention are achieved without the need for separately treating the exterior surfaces of the lens to improve the wettability. Surface treatments may include plasma treatments and coatings. Coatings which provide properties other than improved wettability, such as antimicrobial coatings or the application of color or other cosmetic enhancement, are not considered surface treatment.

The term "surface" when used in reference to the presence of the non-reactive polymeric wetting agent means the outer region of the lens, for instance, the region that may be analyzed by ATR infrared spectroscopy. The surface may comprise the outer 2 microns of the lens. The term "bulk" when used in reference to the presence of the non-reactive polymeric wetting agent in the contact lens means the whole lens, including its surface.

Unless otherwise indicated, ratios, percentages, parts, and the like are by weight.

Unless otherwise indicated, numeric ranges, for instance as in "from 2 to 10," are inclusive of the numbers defining the range (e.g., 2 and 10).

As noted above, in one aspect, the invention provides a silicone hydrogel contact lens that is a reaction product of a reactive mixture comprising a silicone-containing component; a hydrophilic component; a non-reactive polymeric internal wetting agent; and a polymerization initiator, the contact lens having an oxygen permeability of at least about 60 barrers, and wherein the molar ratio in the lens of the polymeric non-reactive internal wetting agent to silicone from the silicone-containing component, without a surface treatment, is greater in the lens's surface than in its bulk.

The molar ratio of the polymeric non-reactive internal wetting agent to silicone in the silicone hydrogel contact lens of the invention may be at least 1.5 times greater in the lens's surface than in its bulk. The molar ratio of the polymeric non-reactive internal wetting agent to silicone may be at least 2 times greater, alternatively at least 2.3 times greater, alternatively at least 3 times greater, alternatively at least 3.5 times greater, alternatively at least 4 times greater, alternatively at least 4.9 times greater, alternatively at least 6 times greater, alternatively at least 7 times greater, alternatively at least 7 times greater, alternatively at least 9 times greater, in the lens's surface than in its bulk. This and other constituent ratios may be measured by a variety of methods. An exemplary method is described in the examples. The method employs infrared spectroscopy in both attenuated total reflectance (ATR) as well as transmittance modes to measure the relative amounts of the constituent molecules of the lens at the surface and in the bulk. According to this method, silicone is identified by the silicone vibrational modes in the infrared spectrum of the material, as would be understood by those skilled in the art.

If the silicone hydrogel lens is made from materials containing (meth)acrylate groups, such groups are readily visible in IR spectroscopy. Thus, when (meth)acrylate groups are present, the increased concentration of polymeric non-reactive internal wetting agent at the surface versus the bulk may also be expressed in terms of the molar ratio of the polymeric non-reactive internal wetting agent to (meth)acrylates. Thus, expressed in this way, the contact lenses of the invention may comprise a molar ratio in the lens of the polymeric non-reactive internal wetting agent to (meth)acrylate groups, without a surface treatment, that is greater in the lens's surface than in its bulk. For instance, the molar ratio of the polymeric non-reactive internal wetting agent to (meth)acrylates may be at least 1.5 times greater, alternatively at least 2 times greater, alternatively at least 2.5 times greater, alternatively at least 3 times greater, alternatively at least 3.5 times greater, alternatively at least 4 times greater, alternatively at least 4.5 times greater, alternatively at least 6 times greater, alternatively at least 7 times greater, alternatively at least 8 times greater, alternatively at least 9 times greater, in the lens's surface than in its bulk.

At the same time that the concentration of the polymeric non-reactive internal wetting agent is enriched at the surface of the lens, other constituent molecules may remain substantially homogenously distributed throughout the lens. For instance, hydrophilic portions of the polymer network other than the polymeric non-reactive internal wetting agent, for example that are introduced via the hydrophilic component (e.g., hydroxylethylmethacrylate) of the reactive monomer mixture, may be substantially homogenously distributed in the lens. By way of example, the molar ratio of the hydrophilic constituent molecules, other than the polymeric non-reactive internal wetting agent, to silicone in the silicone hydrogel contact lens of the invention may be no more than 1.2 times, or alternatively no more than 1.1 times, greater in the lens's surface than in its bulk. By way of further example, the molar ratio of the hydrophilic constituent molecules, other than the polymeric non-reactive internal wetting agent, to silicone in the silicone hydrogel contact lens of the invention may be about the same in the lens's surface as in its bulk.

As discussed above, the silicone hydrogel contact lenses of the invention, by enriching the non-reactive polymeric internal wetting agent at the surface of the lens, provide a number of desirable properties. One such property is improved surface wettability (as measured by advancing dynamic contact angle). For instance, it has been found that silicone hydrogel contact lenses that are the reaction product of a reactive mixture containing as little as 2 weight percent, or as little as 2.5 weight percent, of the non-reactive polymeric internal wetting agent exhibit a dynamic advancing contact angle (Wilhelmy plate method), without a surface treatment, of 75° or less, or 70° or less, or 60° or less, or 50° or less, or 45° or less, or 40° or less, or 35° or less, or 30° or less, or 25° or less, or 22° or less. In contrast, as demonstrated by the examples, lenses prepared from reactive mixtures containing the same amount of a non-reactive polymeric internal wetting agent, but where the wetting agent is not enriched at the surface, exhibit an advancing contact angle of greater than 75° (without a surface treatment).

The silicone hydrogel contact lenses of the invention comprise the reaction product of a reactive mixture that contains a silicone-containing component; a hydrophilic component; a non-reactive polymeric internal wetting agent; and a polymerization initiator.

Silicone-containing components suitable for use in the invention comprise one or more polymerizable compounds, where each compound independently comprises at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above; one or more optionally repeating siloxane units; and one or more linking groups connecting the polymerizable groups to the siloxane units. The silicone-containing component may comprise: one or more polymerizable groups that are independently a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, an N-vinyl lactam, an N-vinylamide, a styryl, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, or mixtures of the foregoing; one or more optionally repeating siloxane units; and one or more linking groups connecting the polymerizable groups to the siloxane units.

The silicone-containing component may comprise one or more polymerizable compounds of Formula A:

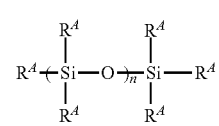

Formula A wherein:
at least one $R^A$ is a group of formula $R_g$-L- wherein $R_g$ is a polymerizable group and L is a linking group, and the remaining $R^A$ are each independently:
(a) $R_g$-L-,
(b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof,
(c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof,
(d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof,
(e) halo,
(f) alkoxy, cyclic alkoxy, or aryloxy,
(g) siloxy,
(h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or
(i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^A$ substituents and if different $R^A$ substituents are present, the n groups may be in random or block configuration.

In Formula A, three $R^A$ may each comprise a polymerizable group, alternatively two $R^A$ may each comprise a polymerizable group, or alternatively one $R^A$ may comprise a polymerizable group.

Examples of silicone-containing components suitable for use in the invention include, but are not limited to, compounds listed in Table A. Where the compounds in Table A contain polysiloxane groups, the number of SiO repeat units in such compounds, unless otherwise indicated, is preferably from 3 to 100, more preferably from 3 to 40, or still more preferably from 3 to 20.

TABLE A 1. mono-methacryloxypropyl terminated mono-n-butyl terminated polydimethylsiloxanes (mPDMS) (preferably containing from 3 to 15 SiO repeating units)
2. mono-acryloxypropyl terminated mono-n-butyl terminated polydimethylsiloxane
3. mono(meth)acryloxypropyl terminated mono-n-methyl terminated polydimethylsiloxane
4. mono(meth)acryloxypropyl terminated mono-n-butyl terminated polydiethylsiloxane
5. mono(meth)acryloxypropyl terminated mono-n-methyl terminated polydiethylsiloxane
6. mono(meth)acrylamidoalkylpolydialkylsiloxanes
7. mono(meth)acryloxyalkyl terminated mono-alkyl polydiarylsiloxanes
8. 3-methacryloxypropyltris(trimethylsiloxy)silane (TRIS)
9. 3-methacryloxypropylbis(trimethylsiloxy)methylsilane
10. 3-methacryloxypropylpentamethyl disiloxane
11. mono(meth)acrylamidoalkylpolydialkylsiloxanes
12. mono(meth)acrylamidoalkyl polydimethylsiloxanes
13. N-(2,3-dihydroxypropane)-N'-(propyl tetra(dimethylsiloxy) dimethylbutylsilane)acrylamide
14. N-[3-tris(trimethylsiloxy)silyl]-propyl acrylamide (TRIS-Am)
15. 2-hydroxy-3-[3-methyl-3,3-di(trimethylsiloxy)silylpropoxy]-propyl methacrylate (SiMAA)
16. 2-hydroxy-3-methacryloxypropyloxypropyl-tris(trimethylsiloxy)silane 17 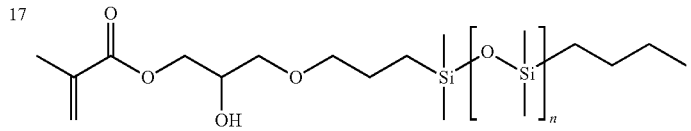

mono-(2-hydroxy-3-methacryloxypropyloxy)-propyl terminated mono-n-butyl terminated polydimethylsiloxanes (OH-mPDMS) (containing from 4 to 30, or from 4 to 20, or from 4 to 15 SiO repeat units)

18 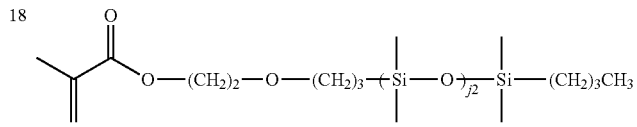

19 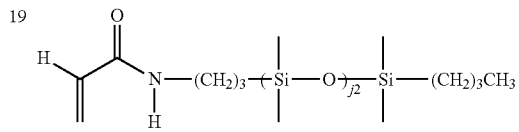

20 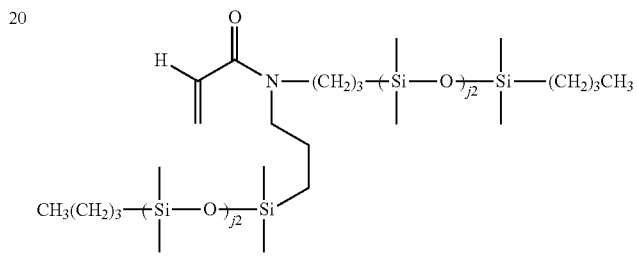

21 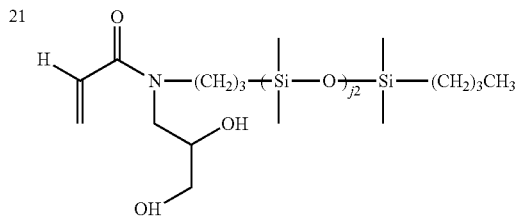

TABLE A-continued

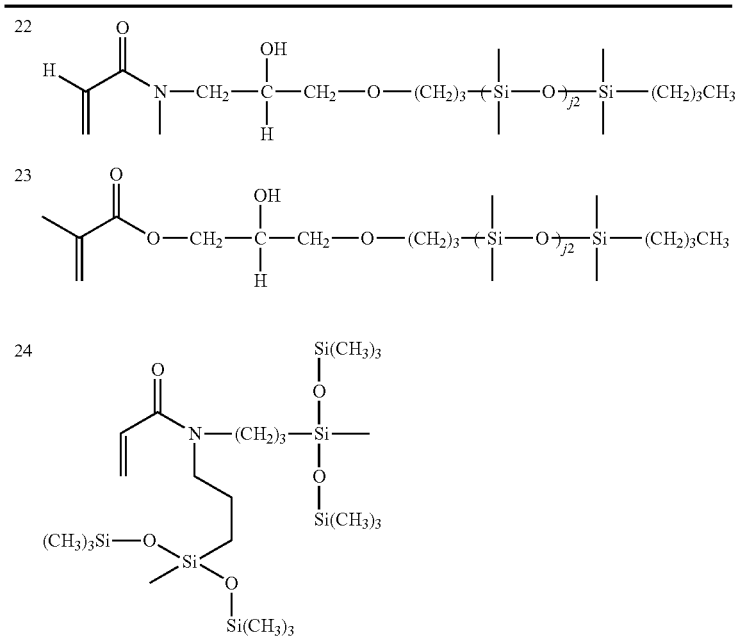

Additional non-limiting examples of suitable silicone-containing components are listed in Table B. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE B

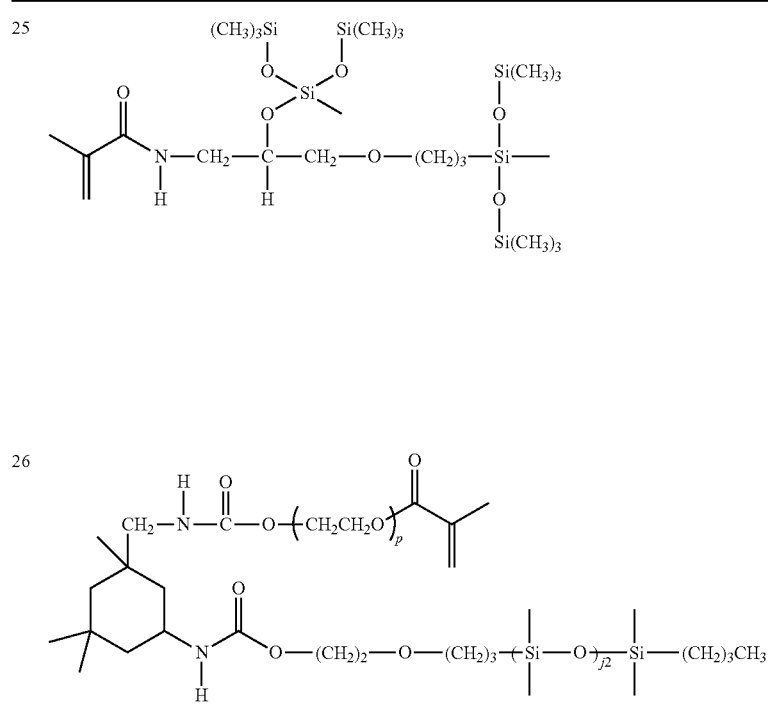

p is 1 to 10

TABLE B-continued

27 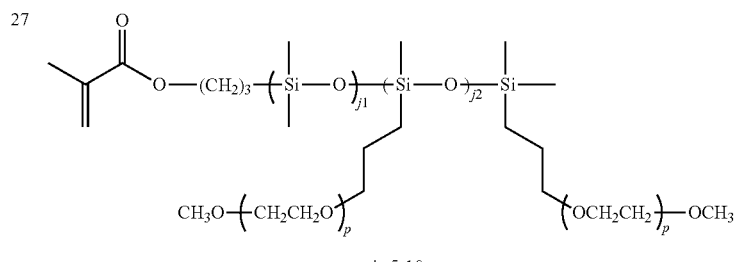

p is 5-10

28 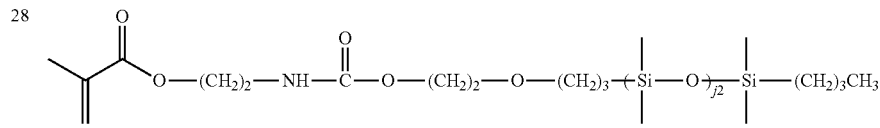

29 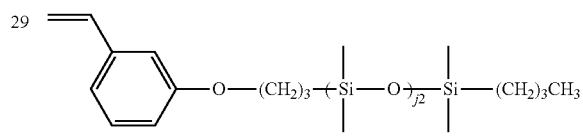

30 1,3-bis[4-(vinyloxycarbonyloxy)but-1-yl]tetramethyl-disiloxane
31 3-(vinyloxycarbonylthio) propyl-[tris (trimethylsiloxy)silane]
32 3-[tris(trimethylsiloxy)silyl] propyl allyl carbamate
33 3-[tris(trimethylsiloxy)silyl] propyl vinyl carbamate
34 tris(trimethylsiloxy)silylstyrene (Styryl-TRIS)

35 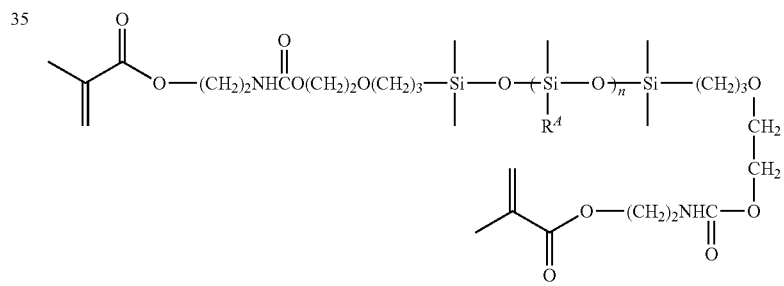

$R^A$ = CH$_3$ (a) or CH$_2$CH$_2$CF$_3$
(b) or CH$_2$—(CH$_2$)$_2$—[OCH$_2$CH$_2$]$_{1-10}$—OCH$_3$
(c); a + b + c = n

36 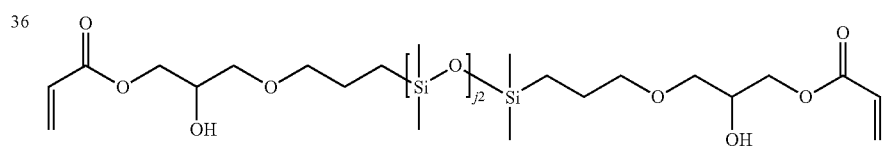

37 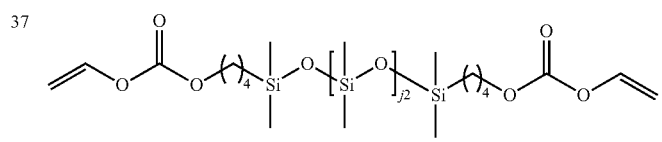

38 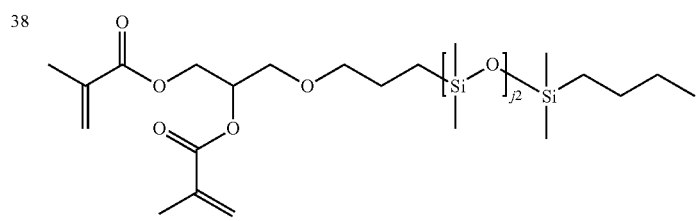

TABLE B-continued

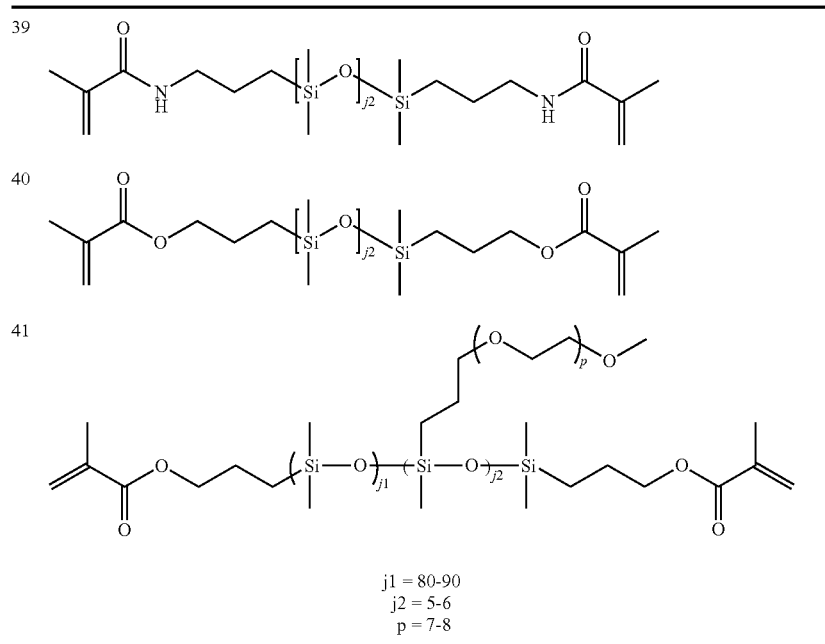

j1 = 80-90
j2 = 5-6
p = 7-8

The silicone-containing component may be a hydroxyl-functionalized silicone containing component. Mixtures of silicone-containing components may be used. For instance, a suitable mixture may include a hydroxyl-functionalized silicone containing component and a non-hydroxyl-functionalized silicone containing component. By way of further example, suitable mixtures may include, but are not limited to: a mixture of mono-(2-hydroxy-3-methacryloxypropyloxy)-propyl terminated mono-n-butyl terminated polydimethylsiloxane (OH-mPDMS) having different molecular weights, such as a mixture of OH-mPDMS containing 4 and 15 SiO repeat units; a mixture of OH-mPDMS with different molecular weights (e.g., containing 4 and 15 repeat SiO repeat units) together with a silicone based crosslinker, such as bis-3-acryloxy-2-hydroxypropyloxypropyl polydimethylsiloxane (ac-PDMS); a mixture of 2-hydroxy-3-[3-methyl-3,3-di(trimethylsiloxy)silylpropoxy]-propyl methacrylate (SiMAA) and mono-methacryloxypropyl terminated mono-n-butyl terminated polydimethylsiloxane (mPDMS), such as mPDMS 1000.

Silicone-containing components for use in the invention may have an average molecular weight from about 400 to about 4000 daltons.

The silicone containing component(s) may be present in amounts up to about 95 weight %, or from about 10 to about 80 weight %, or from about 20 to about 70 weight %, based upon all reactive components of the reactive mixture (i.e., excluding diluents).

Examples of suitable families of hydrophilic monomers that may be used in the reactive mixture include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof.

Non-limiting examples of hydrophilic (meth)acrylate and (meth)acrylamide monomers include: acrylamide, N-isopropyl acrylamide, N,N-dimethylaminopropyl (meth)acrylamide, N,N-dimethyl acrylamide (DMA), 2-hydroxyethyl methacrylate (HEMA), 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, 2-aminoethyl (meth)acrylate, 3-aminopropyl (meth)acrylate, 2-aminopropyl (meth)acrylate, N-2-aminoethyl (meth)acrylamides), N-3-aminopropyl (meth)acrylamide, N-2-aminopropyl (meth)acrylamide, N,N-bis-2-aminoethyl (meth)acrylamides, N,N-bis-3-aminopropyl (meth)acrylamide), N,N-bis-2-aminopropyl (meth)acrylamide, glycerol methacrylate, polyethyleneglycol monomethacrylate, (meth)acrylic acid, vinyl acetate, acrylonitrile, and mixtures thereof.

Hydrophilic monomers may also be ionic, including anionic, cationic, zwitterions, betaines, and mixtures thereof. Non-limiting examples of such charged monomers include (meth)acrylic acid, N-[(ethenyloxy)carbonyl]-β-alanine (VINAL), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT), 1-propanaminium, N,N-dimethyl-N-[3-[(1-oxo-2-propen-1-yl)amino]propyl]-3-sulfo-, inner salt (SBT), 3,5-Dioxa-8-aza-4-phosphaundec-10-en-1-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1- sulfonate (APDAPS), and methacryloyloxy)propyl)dimethylammonio)propane-1-sulfonate (MAPDAPS).

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-vinylimidazole, and mixtures thereof Non-limiting examples of hydrophilic O-vinyl carbamates and O-vinyl carbonates monomers include N-2-hydroxyethyl vinyl carbamate and N-carboxy-β-alanine N-vinyl ester. Further examples of hydrophilic vinyl carbonate or vinyl carbamate monomers are disclosed in U.S. Pat. No. 5,070,215. Hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, and 2-ethyl oxazoline.

The hydrophilic monomers may also be macromers or prepolymers of linear or branched poly(ethylene glycol), poly(propylene glycol), or statistically random or block copolymers of ethylene oxide and propylene oxide, having polymerizable moieties such as (meth)acrylates, styrenes, vinyl ethers, (meth)acrylamides, N-vinylamides, and the like. The macromers of these polyethers have one polymerizable group; the prepolymers may have two or more polymerizable groups.

The preferred hydrophilic monomers of the present invention are DMA, NVP, HEMA, VMA, NVA, and mixtures thereof. Preferred hydrophilic monomers include NVP, DMA, and HEMA, or mixtures thereof. Preferred hydrophilic monomers also include mixtures of DMA and HEMA. Other suitable hydrophilic monomers will be apparent to one skilled in the art.

Generally, there are no particular restrictions with respect to the amount of the hydrophilic monomer present in the reactive monomer mixture. The amount of the hydrophilic monomers may be selected based upon the desired characteristics of the resulting hydrogel, including water content, clarity, wettability, protein uptake, and the like. Wettability may be measured by contact angle, and desirable contact angles are less than about 100°, less than about 80°, and less than about 60°. The hydrophilic monomer may be present in an amount in the range of, for instance, about 0.1 to about 100 weight percent, alternatively in the range of about 1 to about 80 weight percent, alternatively about 5 to about 65 weight percent, alternatively in the range of about 40 to about 60 weight percent, or alternatively about 55 to about 60 weight percent, based on the total weight of the reactive components in the reactive monomer mixture.

The reactive mixture of the invention contains a non-reactive polymeric internal wetting agent. The non-reactive polymeric internal wetting agent may be a hydrophilic polymer. The non-reactive polymeric internal wetting agent may have a weight average molecular weight of at least about 50,000 daltons, alternatively at least about 100,000 daltons, alternatively at least about 150,000 daltons; or from about 150,000 to about 2,000,000 daltons; or from about 300,000 to about 1,800,000 daltons. Higher molecular weight polymers may be used if they are compatible with the reactive monomer mixture.

Alternatively, the molecular weight of non-reactive polymeric internal wetting agents can be expressed by the K-value, based on kinematic viscosity measurements, as described in Encyclopedia of Polymer Science and Engineering, N-Vinyl Amide Polymers, Second edition, Vol. 17, pgs. 198-257, John Wiley & Sons Inc. When expressed in this manner, non-reactive polymeric internal wetting agents having K-values of greater than about 46 and in one embodiment between about 46 and about 150 are preferred. K-values of about K60 to K120, alternatively about K80 to K100, or alternatively about K90 are also preferred.

The amount of non-reactive polymeric internal wetting agent which may be added to the reactive monomer mixture of the invention may be varied depending on the other components used and the desired properties of the resulting product. For instance, the non-reactive polymeric internal wetting agent may be included in amounts from about 0.5 weight percent to about 35 weight percent; from about 1 weight percent to about 20 weight percent; from about 1 weight percent to about 15 weight percent; from about 2 weight percent to about 15 percent; or from about 2 to about 12 percent, all based upon the total weight of all of the reactive components. The amount of the non-reactive polymeric internal wetting agent may range from about 1 percent to about 10 percent by weight based on the total weight of all reactive components.

Non-reactive polymeric internal wetting agents that may be used in the invention include but are not limited to homopolymers, statistically random copolymers, diblock copolymers, triblock copolymers, segmented block copolymers, graft copolymers, and mixtures thereof. Non-limiting examples of non-reactive polymeric internal wetting agents are polyamides, polyesters, polylactones, polyimides, polylactams, polyethers, polyacids homopolymers and copolymers prepared by the free radical polymerization of suitable monomers including acrylates, methacrylates, styrenes, vinyl ethers, acrylamides, methacrylamides, N-vinyllactams, N-vinylamides, O-vinylcarbamates, O-vinylcarbonates, and other vinyl compounds. The non-reactive polymeric internal wetting agents may be made from any hydrophilic monomer, including those listed herein.

Suitable non-reactive polymeric internal wetting agents include, but are not limited to, polyamides. As used herein, the term "polyamide" refers to polymers and copolymers comprising repeating units containing amide groups. The polyamide may comprise cyclic amide groups, acyclic amide groups and combinations thereof and may be any polyamide known to those of skill in the art. Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae G1 and G2:

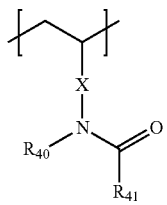

Formula G1

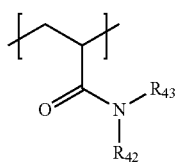

Formula G2 wherein X is a direct bond, —(CO)—, or —(CONHR$_{44}$)—, wherein R$_{44}$ is a C$_1$ to C$_3$ alkyl group; R$_{40}$ is selected from H, straight or branched, substituted or unsubstituted C$_1$ to C$_4$ alkyl groups; R$_{41}$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$_{42}$ is selected from H, straight or branched, substituted or unsubstituted C$_1$ to C$_4$ alkyl groups; or methyl, ethoxy, hydroxyethyl, and hydroxymethyl; R$_{43}$ is selected from H, straight or branched, substituted or unsubstituted C$_1$ to C$_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less; and wherein the number of carbon atoms in R$_{42}$ and R$_{43}$ taken together is 8 or less, including 7, 6, 5, 4, 3, or less. The number of carbon atoms in R$_{40}$ and R$_{41}$ taken together may be 6 or less or 4 or less. The number of carbon atoms in R$_{42}$ and R$_{43}$ taken together may be 6 or less. As used herein substituted alkyl groups include alkyl groups substituted with an amine, amide, ether, hydroxyl, carbonyl or carboxy groups or combinations thereof.

R$_{40}$ and R$_{41}$ may be independently selected from H, substituted or unsubstituted C$_1$ to C$_2$ alkyl groups. X may be a direct bond, and R$_{40}$ and R$_{41}$ may be independently selected from H, substituted or unsubstituted C$_1$ to C$_2$ alkyl groups. R$_{42}$ and R$_{43}$ can be independently selected from H, substituted or unsubstituted C$_1$ to C$_2$ alkyl groups, methyl, ethoxy, hydroxyethyl, and hydroxymethyl.

The acyclic polyamides may comprise a majority of the repeating units of Formula LV or Formula LVI, or the acyclic polyamides can comprise at least 50 mole percent of the repeating unit of Formula G or Formula G1, including at least 70 mole percent, and at least 80 mole percent. Specific examples of repeating units of Formula G and Formula G1 include repeating units derived from N-vinyl-N-methylacetamide, N-vinylacetamide, N-vinyl-N-methylpropionamide, N-vinyl-N-methyl-2-methylpropionamide, N-vinyl-2-methyl-propionamide, N-vinyl-N,N'-dimethylurea, N,N-dimethylacrylamide, methacrylamide, and acyclic amides of Formulae G2 and G3:

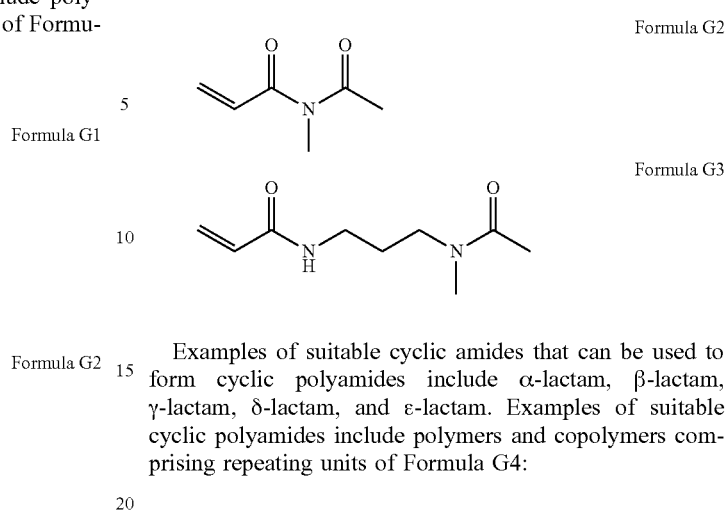

Examples of suitable cyclic amides that can be used to form cyclic polyamides include α-lactam, β-lactam, γ-lactam, δ-lactam, and ε-lactam. Examples of suitable cyclic polyamides include polymers and copolymers comprising repeating units of Formula G4:

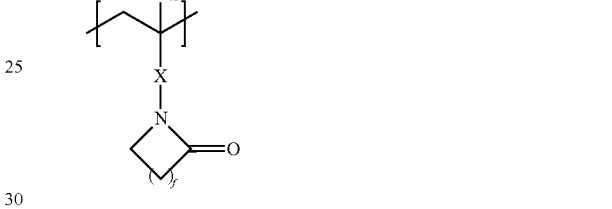

Formula G4 wherein R$_{45}$ is a hydrogen atom or methyl group; wherein f is a number from 1 to 10; wherein X is a direct bond, —(CO)—, or —(CONHR$_{46}$)—, wherein R$_{46}$ is a C$_1$ to C$_3$ alkyl group. In Formula LIX, f may be 8 or less, including 7, 6, 5, 4, 3, 2, or 1. In Formula G4, f may be 6 or less, including 5, 4, 3, 2, or 1. In Formula G4, f may be from 2 to 8, including 2, 3, 4, 5, 6, 7, or 8. In Formula LIX, f may be 2 or 3. When X is a direct bond, f may be 2. In such instances, the cyclic polyamide may be polyvinylpyrrolidone (PVP).

Cyclic polyamides may comprise 50 mole percent or more of the repeating unit of Formula G4, or the cyclic polyamides can comprise at least 50 mole percent of the repeating unit of Formula G4, including at least 70 mole percent, and at least 80 mole percent.

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth) acrylates. Any of the monomers listed as suitable hydrophilic monomers may be used as co-monomers to form the additional repeating units. Specific examples of additional monomers which may be used to form polyamides include 2-hydroxyethyl (meth)acrylate, vinyl acetate, acrylonitrile, hydroxypropyl (meth)acrylate, methyl (meth)acrylate and hydroxybutyl (meth)acrylate, dihydroxypropyl (meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-β-alanine (VINAL, CAS #148969-96-4), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N,N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio) propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. The polyamide may be a mixture of PVP (e.g., PVP K90) and PVMA (e.g., having a Mw of about 570 KDa).

Preferred non-reactive polymeric internal wetting agents include polyamides, such those selected from polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. A particularly preferred non-reactive polymeric internal wetting agent is PVP, more preferably PVP K90. Another preferred wetting agent is PVMA.

The non-reactive polymeric internal wetting agent, such as polyamides, for use in the invention are non-polymerizable and as such are incorporated into the silicone hydrogels as semi-interpenetrating networks. The polyamides are entrapped or physically retained within the silicone hydrogels. The silicone hydrogels may also contain polymerizable internal wetting agents, such as polymerizable polyamides, for example as polyamide macromers or prepolymers, and in this case, are covalently incorporated into the silicone hydrogels. Mixtures of polymerizable and non-polymerizable polymeric wetting agents may also be used.

The reactive mixture of the invention contains a polymerization initiator. Preferably, the polymerization initiator is a thermal initiator. Thermal initiators decompose at elevated temperatures to generate free radicals. Typical examples are azo compounds such as 1,1'-azobisisobutyronitrile and 4,4'-azobis(4-cyanovaleric acid). The amount of the polymerization initiator is not critical and may range, for instance, from about 0.1 to about 2.0 percent by weight, based on the total weight of all reactive components in the reactive mixture.

The reactive mixture may contain additional components such as, but not limited to, crosslinkers, diluents, initiators, UV absorbers, visible light absorbers, photochromic compounds, pharmaceuticals, nutraceuticals, antimicrobial substances, tints, pigments, copolymerizable dyes, nonpolymerizable dyes, and combinations thereof.

As noted, one or more cross-linking agents, also referred to as cross-linking monomers, multi-functional macromers, and prepolymers, may be included in the reactive mixture.

The cross-linking agents may be selected from bifunctional crosslinkers, trifunctional crosslinkers, tetrafunctional crosslinkers, and mixtures thereof, including silicone-containing and non-silicone containing cross-linking agents. Non-silicone-containing cross-linking agents include ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allylmethacrylate, methylene bisacrylamide (MBA), and polyethylene glycol dimethacrylate wherein the polyethylene glycol has a molecular weight up to about 5000 Daltons. The cross-linking agents may be used varying amounts, e.g., from about 0.000415 to about 0.0156 mole per 100 grams of reactive components in the reactive mixture. Examples of hydrophilic monomers and macromers which can act as the cross-linking agents and when present do not require the addition of an additional cross-linking agent to the reactive mixture include (meth)acrylate and (meth)acrylamide endcapped polyethers. Other cross-linking agents will be known to one skilled in the art and may be used to make the silicone hydrogel of the present invention.

It may be desirable to select crosslinking agents with similar reactivity to one or more of the other reactive components in the formulation. In some cases, it may be desirable to select a mixture of crosslinking agents with different reactivity in order to control some physical, mechanical or biological property of the resulting silicone hydrogel. The structure and morphology of the silicone hydrogel may also be influenced by the diluent(s) and cure conditions used.

Multifunctional silicone-containing components, including macromers, cross-linking agents, and prepolymers, may also be included to further increase the modulus and retain tensile strength. The silicone containing cross-linking agents may be used alone or in combination with other cross-linking agents. An example of a silicone containing component which can act as a cross-linking agent and, when present, does not require the addition of a crosslinking monomer to the reactive mixture includes α, ω-bismethacryloxypropyl polydimethylsiloxane. Another example is bis-3-acryloxy-2-hydroxypropyloxypropyl polydimethylsiloxane (ac-PDMS).

Cross-linking agents that have rigid chemical structures and polymerizable groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)-phenyl]propane, and 4-vinylbenzyl methacrylate, and combinations thereof. Rigid crosslinking agents may be included in amounts between about 0.5 and about 15 percent, or 2-10, or 3-7 based upon the total weight of all of the reactive components. The physical and mechanical properties of the silicone hydrogels of the present invention may be optimized for a particular use by adjusting the components in the reactive mixture.

Non-limiting examples of silicone cross-linking agents also include the multi-functional silicone-containing components described in Table A above.

Classes of suitable diluents for silicone hydrogel reactive mixtures include alcohols having 2 to 20 carbon atoms, amides having 10 to 20 carbon atoms derived from primary amines and carboxylic acids having 8 to 20 carbon atoms. The diluents may be primary, secondary, and tertiary alcohols.

Generally, the reactive components are mixed in a diluent to form a reactive mixture. Suitable diluents are known in the art. For silicone hydrogels, suitable diluents are disclosed in WO 03/022321 and U.S. Pat. No. 6,020,445, the disclosure of which is incorporated herein by reference. Classes of suitable diluents for silicone hydrogel reactive mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms. Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino) ethanol mixtures thereof and the like. Examples of amide diluents include N,N-dimethyl propionamide and dimethyl acetamide.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

If a diluent is present, generally there are no particular restrictions with respect to the amount of diluent present. When diluent is used, the diluent may be present in an amount in the range of about 2 to about 70 weight percent, including in the range of about 5 to about 50 weight percent, and in the range of about 15 to about 40 weight percent, based on the total weight of the reactive mixtures (including reactive and nonreactive Formulas). Mixtures of diluents may be used.

The reactive mixture of the invention may comprise: a hydrophilic component selected from DMA, NVP, HEMA, VMA, NVA, and mixtures thereof; a silicone-containing component comprising a compound of formula A; a non-reactive polymeric internal wetting agent (preferably a polyamide, more preferably PVP or PVMA); and a polymerization initiator.

The reactive mixture may comprise: a hydrophilic component selected from DMA, HEMA and mixtures thereof, a silicone-containing component selected from 2-hydroxy-3-[3-methyl-3,3-di(trimethylsiloxy)silylpropoxy]-propyl methacrylate (SiMAA), mono-methacryloxypropyl terminated mono-n-butyl terminated polydimethylsiloxane (mPDMS), mono-(2-hydroxy-3-methacryloxypropyl)-propyl ether terminated mono-n-butyl terminated polydimethylsiloxane (OH-mPDMS), and mixtures thereof, a non-reactive polymeric internal wetting agent (preferably a polyamide, more preferably PVP or PVMA); and a polymerization initiator. For the hydrophilic component, mixtures of DMA and HEMA are preferred. For the silicone containing component, mixtures of SiMAA and mPDMS are preferred.

The reactive mixture may comprise: a hydrophilic component comprising a mixture of DMA and HEMA; a silicone-containing component comprising a mixture of OH-mPDMS having from 2 to 20 repeat units (preferably a mixture of 4 and 15 repeat units); a non-reactive polymeric internal wetting agent (preferably a polyamide, more preferably PVP or PVMA); and a polymerization initiator. Preferably, the reactive mixture further comprises a silicone-containing crosslinker, such as ac-PDMS.

The reactive mixture may comprise: between about 1 and about 15 wt % of a non-reactive polymeric internal wetting agent (preferably a polyamide, e.g., an acyclic polyamide, a cyclic polyamide, or mixtures thereof); a polymerization initiator; at least one first mono-functional, hydroxyl substituted poly(disubstituted siloxane) having 4 to 8 siloxane repeating units (e.g., OH-mPDMS where n is 4 to 8, preferably n is 4); at least one second hydroxyl substituted poly(disubstituted siloxane) that is a mono-functional hydroxyl substituted poly(disubstituted siloxane)s having 10 to 200 or 10-100 or 10-50 or 10-20 siloxane repeating units (e.g., OH-mPDMS where n is 10 to 200 or 10-100 or 10-50 or 10-20, preferably n is 15); about 5 to about 35 wt % of at least one hydrophilic monomer; and optionally a multi-functional hydroxyl substituted poly(disubstituted siloxane)s having 10 to 200, or 10 to 100 siloxane repeating units (e.g., ac-PDMS). Preferably, the first mono-functional, hydroxyl substituted poly(disubstituted siloxane) and the second hydroxyl substituted poly(disubstituted siloxane) are present in concentrations to provide a ratio of weight percent of the first mono-functional, hydroxyl substituted poly(disubstituted siloxane) to weight percent of the second hydroxyl substituted poly(disubstituted siloxane) of 0.4-1.3, or 0.4-1.0.

The reactive mixture may be cured within a lens mold to form a silicone hydrogel contact lens. As discussed above, lenses of the invention contain an enriched concentration of the non-reactive polymeric internal wetting agent at the lens surface. To achieve this enrichment, the curing of the reactive mixture to form the silicone hydrogel contact lens is preferably conducted under thermal curing conditions. In particular, it has been discovered that by selecting a specific thermal curing temperature range, the silicone hydrogel contact lenses of the invention may be prepared. As discussed above, such lenses provide more efficient use of the wetting agent by positioning the agent where it is needed, resulting, for instance, in improved surface wettability at substantially the same overall wetting agent concentration as existing lenses. Or surface enriched lenses may provide the option to use less wetting agent to achieve substantially the same wettability as existing lenses, which may in turn simplify the manufacturing process and/or reduce costs.

The selected thermal curing conditions of the inventions also yield a more efficient curing process. In particular, it has been further discovered that under the thermal curing conditions described herein, the total conversion of polymerizable components in the reactive mixture into polymer are greatly improved. For instance, following polymerization of the reactive mixture but prior to extraction, the contact lenses made by the methods of the invention may contain less unpolymerized polymerizable components than lenses made by other methods, including by other thermal curing methods. For example, the lens may contain no more than 0.3 weight percent of unpolymerized polymerizable components (following curing but prior to extraction).

According to the invention, a method for manufacturing a contact lens is provided. The method comprises (a) providing a reactive mixture comprising a silicone-containing component; a hydrophilic component; a non-reactive polymeric internal wetting agent; and a polymerization initiator; and (b) polymerizing the reactive mixture to form the contact lens; wherein the method is conducted under conditions such that the contact lens has a molar ratio of the polymeric non-reactive internal wetting agent to silicone, without a surface treatment, that is greater in the lens's surface than in its bulk. Preferably, the polymerization conditions may be thermal curing conditions. A preferred method comprises: (a) providing a reactive mixture comprising a silicone-containing component; a hydrophilic component; a non-reactive polymeric internal wetting agent; and a polymerization initiator; (b) polymerizing the reactive mixture under thermal curing conditions to form the contact lens; and (c) extracting the contact lens to remove unreacted components, wherein the thermal curing conditions of step (b) comprise curing at a temperature from 60 to 120 degrees Celsius.

The reactive mixture (including optional components such as diluents) may be placed in a mold having the shape of the final desired contact lens. following placement, the reactive mixture is polymerized under thermal curing conditions at a temperature from 60 to 120 degrees Celsius as described above. The thermal curing temperature may be at least 65 degrees Celsius, alternatively at least 70 degrees Celsius, alternatively at least 75 degrees Celsius, alternatively at least 80 degrees Celsius, alternatively at least 85 degrees Celsius, alternatively at least 86 degrees Celsius, or alternatively at least 87 degrees Celsius. The thermal curing temperature may be up to 115 degrees Celsius, alternatively up to 110 degrees Celsius, alternatively up to 105 degrees Celsius, alternatively up to 100 degrees Celsius, alternatively up to 95 degrees Celsius, alternatively up to 94 degrees Celsius, or alternatively up to 93 degrees Celsius. The thermal curing temperature may be from 85 degrees Celsius to 95 degrees Celsius, or from 87 degrees Celsius to 93 degrees Celsius. The thermal curing temperature may be 90 degrees Celsius.

The reactive mixture may be cured for sufficient time to reach the desired level of conversion. Preferably, the reactive mixture is cured for sufficient time to achieve at least 90 mole percent conversion, or at least 95 mole percent conversion, or at least 98 mole percent conversion, or at least 99 mole percent conversion, or at least 99.8 mole percent conversion of the polymerizable components in the reactive mixture to polymer. By way of example, the curing time may be from 20 minutes to 90 minutes, or from 30 minutes to 70 minutes. Preferably the curing time is at least 30 minutes, or at least 45 minutes, or at least 60 minutes.

After curing, the lens may be subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble Formulas such as inorganic salts or release agents, wetting agents, slip agents, pharmaceutical and nutraceutical Formulas, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may not require special handling, such as purification, recycling or special disposal procedures.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leaching or extraction aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

The lenses may be sterilized by known means such as, but not limited to, autoclaving.

Silicone hydrogel contact lenses according to the invention preferably exhibit the following properties. All values are prefaced by "about," and the devices may have any combination of the listed properties. The properties may be determined by methods known to those skilled in the art, for instance as described in United States pre-grant publication US20180037690, which is incorporated herein by reference.

Water concentration %: at least 20%, or at least 25% and up to 80% or up to 70%

Haze: 30% or less, or 10% or less

Advancing dynamic contact angle (Wilhelmy plate method): 800 or less, or 750 or less, or 50° or less Tensile Modulus (psi): 120 or less, or 80 to 120

Oxygen permeability (Dk, barrers): at least 60, or at least 80, or at least 100, or at least 150, or at least 200

Elongation to Break: at least 100

For ionic silicon hydrogels, the following properties may also be preferred (in addition to those recited above):

Lysozyme uptake (μg/lens): at least 100, or at least 150, or at least 500, or at least 700

Polyquaternium 1 (PQ1) uptake (%): 15 or less, or 10 or less, or 5 or less

Silicone hydrogel contact lenses that are made by thermal curing as described herein may exhibit a molar ratio of the polymeric non-reactive internal wetting agent to silicone in the surface of the lens that is greater than in the surface of a contact lens having similar composition but made by photochemical curing. For instance, the molar ratio of the polymeric non-reactive internal wetting agent to silicone in the surface of a lens made by thermal curing as described herein may be at least 2.5 times greater, alternatively at least 3 times greater, alternatively at least 3.5 times greater, or alternatively at least 4 times greater, than in the surface of a contact lens having similar composition but made by photochemical curing. By "similar composition" is meant that the constituents of the reactive mixtures are the same except for the free radical initiator, which may be a photochemical free radical initiator in the case of a photochemically cured lens, and a thermal free radical initiator in the case of a thermally cured lens.

Silicone hydrogel contact lenses that are made by thermal curing as described herein may exhibit a molar ratio of the polymeric non-reactive internal wetting agent to silicone in the bulk that is substantially the same as in the bulk of a contact lens having similar composition but made by photochemical curing. By "substantially the same" is meant that the molar ratio of polymeric non-reactive internal wetting agent to silicone in the bulk of the thermally cured lens is no more than 1.1 times greater than in the bulk of a photochemically cured lens. The molar ratio of polymeric non-reactive internal wetting agent to silicone in the bulk of the thermally cured lens may be the same as in the bulk of a photochemically cured lens.

The following clauses list non-limiting embodiments of the disclosure:

1. A silicone hydrogel contact lens that is a reaction product of a reactive mixture comprising: a silicone-containing component; a hydrophilic component; a non-reactive polymeric internal wetting agent; and a polymerization initiator, the contact lens having an oxygen permeability of at least about 60 barrers, and wherein, in a lens that is the reaction product of a reactive mixture containing as little as 2.0 weight percent or as little as 2.5 weight percent of the non-reactive polymeric internal wetting agent (based on the total weight of the reactive components in the reactive mixture), the lens comprises an advancing contact angle of 750 or less without a surface treatment.
2. The contact lens of clause 1 wherein the advancing contact angle is 700 or less, or 60° or less, or 50° or less, or 450 or less, or 40° or less, or 350 or less, or 30° or less, or 250 or less, or 220 or less.
3. The contact lenses of clause 1 or 2 wherein the molar ratio in the lens of the polymeric non-reactive internal wetting agent to silicone, without a surface treatment, is greater in the lens's surface than in its bulk.
4. The silicone hydrogel contact lens of clause 3 wherein the molar ratio of the polymeric non-reactive internal wetting agent to silicone is at least 1.5 times greater, or at least 2 times greater, or at least 2.3 times greater, or at least 3 times greater, or at least 3.5 times greater, or at least 4 times greater, or at least 4.9 times greater, or at least 6 times greater, or at least 7 times greater, or at least 7 times greater, or at least 9 times greater, in the lens's surface than in its bulk.
5. The silicone hydrogel contact lens of any one of clauses 1 to 4 wherein the non-reactive polymeric internal wetting agent is a polyamide.
6. The silicone hydrogel contact lens of any one of clauses 1 to 5 wherein the non-reactive polymeric internal wetting agent is selected from polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.
7. A method for manufacturing a contact lens, the method comprising:
   (a) providing a reactive mixture comprising a silicone-containing component; a hydrophilic component; a non-reactive polymeric internal wetting agent; and a polymerization initiator; and
   (b) polymerizing the reactive mixture to form the contact lens;
   wherein the method is conducted under conditions such that in a lens that is the reaction product of a reactive mixture containing as little as 2.0 weight percent, or as little as 2.5 weight percent, of the non-reactive polymeric internal wetting agent (based on the total weight of the reactive components in the reactive mixture), the lens comprises an advancing contact angle of 750 or less without a surface treatment.
8. The method of clause 7 wherein the advancing contact angle is 70° or less, or 60° or less, or 50° or less, or 45° or less, or 40° or less, or 35° or less, or 30° or less, or 25° or less, or 22° or less.
9. The method of clause 7 or 8 wherein the molar ratio in the lens of the polymeric non-reactive internal wetting agent to silicone, without a surface treatment, is greater in the lens's surface than in its bulk.
10. The method of clause 9 wherein the molar ratio of the polymeric non-reactive internal wetting agent to silicone is at least 1.5 times greater, or at least 2 times greater, or at least 2.3 times greater, or at least 3 times greater, or at least 3.5 times greater, or at least 4 times greater, or at least 4.9 times greater, or at least 6 times greater, or at least 7 times greater, or at least 7 times greater, or at least 9 times greater, in the lens's surface than in its bulk.
11. The method of any one of clauses 7 to 10 wherein the non-reactive polymeric internal wetting agent is a polyamide.
12. The method of any one of clauses 7 to 11 wherein the non-reactive polymeric internal wetting agent is selected from polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.
13. A silicone hydrogel contact lens that is a thermally cured reaction product of a reactive mixture comprising: a silicone-containing component; a hydrophilic component; a non-reactive polymeric internal wetting agent; and a polymerization initiator, the contact lens having an oxygen permeability of at least about 60 barrers, and wherein the lens has a molar ratio of the polymeric non-reactive internal wetting agent to silicone in its surface that is greater than in the surface of a contact lens having similar composition but made by photochemical curing.
14. The silicone hydrogel contact lens of clause 13 wherein the molar ratio of polymeric non-reactive internal wetting agent to silicone in the surface of the thermally cured lens is at least 2.5 times greater, alternatively at least 3 times greater, alternatively at least 3.5 times greater, or alternatively at least 4 times greater, than in the surface of a contact lens having similar composition but made by photochemical curing.
15. The silicone hydrogel contact lens of any one of clauses 13 to 14 wherein the molar ratio of polymeric non-reactive internal wetting agent to silicone in the bulk of the thermally cured lens is substantially the same as in the bulk of a contact lens having similar composition but made by photochemical curing.
16. The silicone hydrogel contact lens of any one of clauses 13 to 15 wherein the non-reactive polymeric internal wetting agent is a polyamide.

17. The silicone hydrogel contact lens of any one of clauses 13 to 16 wherein the non-reactive polymeric internal wetting agent is selected from polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

18. A method for manufacturing a contact lens, the method comprising:
    (a) providing a reactive mixture comprising a silicone-containing component; a hydrophilic component; a non-reactive polymeric internal wetting agent; and a polymerization initiator;
    (b) thermally curing the reactive mixture to form the contact lens; and
    (c) extracting the contact lens to remove unpolymerized components,
    wherein the method is conducted under conditions such that the contact lens has a molar ratio of the polymeric non-reactive internal wetting agent to silicone in its surface that is greater than in the surface of a contact lens having similar composition but made by photochemical curing.

19. The method of clause 18 wherein the molar ratio of polymeric non-reactive internal wetting agent to silicone in the surface of the thermally cured lens is at least 2.5 times greater, alternatively at least 3 times greater, alternatively at least 3.5 times greater, or alternatively at least 4 times greater, than in the surface of a contact lens having similar composition but made by photochemical curing.

20. The method of any one of clauses 18 to 19 wherein the molar ratio of polymeric non-reactive internal wetting agent to silicone in the bulk of the thermally cured lens is substantially the same as in the bulk of a contact lens having similar composition but made by photochemical curing.

21. A silicone hydrogel contact lens that is a reaction product of a reactive mixture comprising: a silicone-containing component; a hydrophilic component; a non-reactive polymeric internal wetting agent; and a polymerization initiator, the contact lens having an oxygen permeability of at least about 60 barrers, and wherein the molar ratio in the lens of the polymeric non-reactive internal wetting agent to silicone, without a surface treatment, is greater in the lens's surface than in its bulk.

22. The silicone hydrogel contact lens of clause 21 wherein the molar ratio of the polymeric non-reactive internal wetting agent to silicone is at least 1.5 times greater in the lens's surface than in its bulk.

23. The silicone hydrogel contact lens of any one of clauses 21 to 22 wherein the molar ratio of the polymeric non-reactive internal wetting agent to silicone is at least 2.3 times greater in the lens's surface than in its bulk.

24. The silicone hydrogel contact lens of any one of clauses 21 to 23 wherein the non-reactive polymeric internal wetting agent is a polyamide.

25. The silicone hydrogel contact lens of any one of clauses 21 to 24 wherein the non-reactive polymeric internal wetting agent is selected from polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

26. The silicone hydrogel contact lens of any one of clauses 21 to 25 wherein, in a lens that is the reaction product of a reactive mixture containing 2.5 weight percent of the non-reactive polymeric internal wetting agent, the lens comprises an advancing contact angle of 750 or less.

27. The silicone hydrogel contact lens of clause 6 wherein the advancing contact angle is 500 or less.

28. A method for manufacturing a contact lens, the method comprising:
    (a) providing a reactive mixture comprising a silicone-containing component; a hydrophilic component; a non-reactive polymeric internal wetting agent; and a polymerization initiator; and
    (b) polymerizing the reactive mixture to form the contact lens;
    wherein the method is conducted under conditions such that the contact lens has a molar ratio of the polymeric non-reactive internal wetting agent to silicone, without a surface treatment, that is greater in the lens's surface than in its bulk.

29. The method of clause 28 wherein the molar ratio of the polymeric non-reactive internal wetting agent to silicone is at least 1.5 times greater in the lens's surface than in its bulk.

30. The method of any one of clauses 28 to 29 wherein the molar ratio of the polymeric non-reactive internal wetting agent to silicone is at least 2.3 times greater in the lens's surface than in its bulk.

31. The method of any one of clauses 28 to 30 wherein the non-reactive polymeric internal wetting agent is a polyamide.

32. The method of any one of clauses 28 to 31 wherein the non-reactive polymeric internal wetting agent is selected from polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

33. The method of any one of clauses 28 to 32 wherein, in a lens that is the reaction product of a reactive mixture containing 2.5 weight percent of the non-reactive polymeric internal wetting agent, the lens comprises an advancing contact angle of 750 or less.

34. The method of clause 33 wherein the advancing contact angle is 500 or less.

35. The method of any one of clauses 28 to 34 wherein step (b) comprises thermally curing the reactive mixture.

36. The method of clause 35 wherein the thermally curing is conducted at a temperature from 60 to 120 degrees Celsius.

37. The method of any one of clauses 35 to 36 wherein the thermally curing is conducted at a temperature from 85 to 120 degrees Celsius.

38. The method of any one of clauses 28 to 37 wherein, following step (b) and prior to an extraction step to remove unpolymerized components from the contact lens, the contact lens contains no more than 0.3 weight percent of unpolymerized polymerizable components.

39. A silicone hydrogel contact lens made by the method of any one of clauses 28 to 38.

40. A method for importing the silicone hydrogel contact lens of any one of clauses 21 to 27 into a country.

41. The method of clause 40 wherein the country is the United States of America.

Some embodiments of the invention will now be described in detail in the following Examples.

EXAMPLES

The contact lens diameter (DM) was measured on a calibrated Van Keuren micro optical comparator equipment equipped with Mitutoyo digimatic micrometer heads. The contact lens was placed concave side down into a crystal cell completely filled with borate buffered packing solution. A cap was placed onto the cell ensuring that no air is trapped underneath. The cell was then placed on the comparator stage and the lens image brought into focus and aligned so that one edge of the lens touched the center line on the screen. The first edge was marked, the lens moved along its diameter until the second edge is touching the center line on the screen, and then, the second edge is marked by pushing the data button again. Typically, two diameter measurements are made and the average reported in the data tables.

Water content (WC) was measured gravimetrically. Lenses were equilibrated in packing solution for 24 hours. Each of three test lenses is removed from packing solution using a sponge tipped swab and placed on blotting wipes which have been dampened with packing solution. Both sides of the lens are contacted with the wipe. Using tweezers, the test lenses are placed in a tared weighing pan and weighed. The two more sets of samples are prepared and weighed. All weight measurements were done in triplicate, and the average of those values used in the calculations. The wet weight is defined as the combined weight of the pan and wet lenses minus the weight of the weighing pan alone.

The dry weight was measured by placing the sample pans in a vacuum oven which has been preheated to 60° C. for 30 minutes. Vacuum was applied until the pressure reaches at least 1 inch of Hg is attained; lower pressures are allowed. The vacuum valve and pump are turned off and the lenses are dried for at least 12 hours, typically overnight. The purge valve is opened allowing dry air or dry nitrogen gas to enter. The oven is allowed reach atmospheric pressure. The pans are removed and weighed. The dry weight is defined as the combined weight of the pan and dry lenses minus the weight of the weighing pan alone. The water content of the test lens was calculated as follows: % water content=(wet weight−dry weight)/wet weight×100. The average and standard deviation of the water content were calculated, and the average value reported as the percent water content of the test lens.

The refractive index (RI) of a contact lens was measured by a Leica ARIAS 500 Abbe refractometer in manual mode or by a Reichert ARIAS 500 Abbe refractometer in automatic mode with a prism gap distance of 100 microns. The instrument was calibrated using deionized water at 20° C. (+/−0.2° C.). The prism assembly was opened, and the test lens placed on the lower prism between the magnetic dots closest to the light source. If the prism is dry, a few drops of saline were applied to the bottom prism. The front curve of the lens was against the bottom prism. The prism assembly was then closed. After adjusting the controls so that the shadow line appeared in the reticle field, the refractive index was measured. The RI measurement was made on five test lenses. The average RI calculated from the five measurements was recorded as the refractive index as well as its standard deviation.

Haze may be measured by placing a hydrated test lens in borate buffered saline in a clear glass cell at ambient temperature above a flat black background, illuminating from below with a fiber optic lamp (Dolan-Jenner PL-900 fiber optic light with 0.5" diameter light guide) at an angle 660 normal to the lens cell, and capturing an image of the lens from above, normal to the lens cell with a video camera (DVC 1300C:19130 RGB camera or equivalent equipped with a suitable zoom camera lens) placed 14 mm above the lens holder. The background scatter is subtracted from the scatter of the test lens by subtracting an image of a blank cell with borate buffered saline (baseline) using EPIX XCAP V 3.8 software. The value for high end scatter (frosted glass) is obtained by adjusting the light intensity to be between 900 to 910 mean grayscale. The value of the background scatter (BS) is measured using a saline filled glass cell. The subtracted scattered light image is quantitatively analyzed, by integrating over the central 10 mm of the lens, and then comparing to a frosted glass standard. The light intensity/power setting was adjusted to achieve a mean grayscale value in the range of 900-910 for the frosted glass standard; at this setting, the baseline mean grayscale value was in the range of 50-70. The mean grayscale values of the baseline and frosted glass standard were recorded and used to create a scale from zero to 100, respectively. In the grayscale analysis, the mean and standard deviations of the baseline, frosted glass, and every test lens was recorded. For each lens, a scaled value was calculated according to the equation: scaled value equals the mean grayscale value (lens minus baseline) divided by the mean grayscale value (frosted glass minus baseline) times by 100%. Three to five test lenses are analyzed, and the results are averaged and report as % Haze.

Oxygen permeability (Dk) was determined by the polarographic method generally described in ISO 9913-1:1996 and ISO 18369-4:2006, but with the following modifications. The measurement was conducted at an environment containing 2.1% oxygen created by equipping the test chamber with nitrogen and air inputs set at the appropriate ratio, for example, 1800 mL/min of nitrogen and 200 mL/min of air. The t/Dk is calculated using the adjusted oxygen concentration. Borate buffered saline was used. The dark current was measured by using a pure humidified nitrogen environment instead of applying MMA lenses. The lenses were not blotted before measuring. Four lenses were stacked instead of using lenses of various thickness (t) measured in centimeters. A curved sensor was used in place of a flat sensor; radius was 7.8 mm. The calculations for a 7.8 mm radius sensor and 10% (v/v) air flow are as follows:

$$Dk/t = (\text{measured current} - \text{dark current}) \times (2.97 \times 10^{-8} \text{ mL } O_2/(\mu A\text{-sec-cm}^2\text{-mm Hg})$$

The edge correction was related to the Dk of the material. For all Dk values less than 90 barrers:

$$t/Dk(\text{edge corrected}) = (1 + (5.88 \times t)) \times (t/Dk)$$

For Dk values between 90 and 300 barrers:

$$t/Dk(\text{edge corrected}) = (1 + (3.56 \times t)) \times (t/Dk)$$

For Dk values greater than 300 barrers:

$$t/Dk(\text{edge corrected}) = (1 + (3.16 \times t)) \times (t/Dk)$$

Non-edge corrected Dk was calculated from the reciprocal of the slope obtained from the linear regression analysis of the data wherein the x variable was the center thickness in centimeters and the y variable was the t/Dk value. On the other hand, edge corrected Dk (EC Dk) was calculated from the reciprocal of the slope obtained from the linear regression analysis of the data wherein the x variable was the center thickness in centimeters and the y variable was the edge corrected t/Dk value. The resulting Dk value was reported in barrers.

Wettability of lenses was determined using the methods below. Dynamic contact angle was determined by a Wilhelmy plate method using a Cahn DCA-315 instrument at room temperature and using deionized water as the probe solution (Cahn DCA). The experiment was performed by dipping the lens specimen of known parameter into the packing solution of known surface tension while measuring the force exerted on the sample due to wetting by a sensitive balance. The advancing contact angle of the packing solution on the lens is determined from the force data collected during sample dipping. The receding contact angle is likewise determined from force data while withdrawing the sample from the liquid. The Wilhelmy plate method is based on the following formula: Fg=γρ cos θ−B, wherein F=the wetting force between the liquid and the lens (mg), g=gravitational acceleration (980.665 cm/sec$^2$), γ=surface tension of probe liquid (dyne/cm), ρ=the perimeter of the contact lens at the liquid/lens meniscus (cm), θ=the dynamic contact angle (degree), and B=buoyancy (mg). B is zero at the zero depth of immersion. Four test strips were cut from the central area of the contact lens. Each strip was approximately 5 mm in width and equilibrated in packing solution. Then, each sample was cycled four times, and the results were averaged to obtain the advancing and receding contact angles of the lens. Advancing and receding dynamic contact angles are listed in the tables in that order.

Wettability of lenses may also be determined using a sessile drop technique using KRUSS DSA-100 ™ instrument at room temperature and using deionized water as probe solution (Sessile Drop). The lenses to be tested were rinsed in deionized water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds, and the contact angle was measured between the drop image and the lens surface. Typically, three to five lenses were evaluated, and the average contact angle reported.

The mechanical properties of the contact lenses were measured by using a tensile testing machine such as an Instron model 1122 or 5542 equipped with a load cell and pneumatic grip controls. Minus one diopter lens is the preferred lens geometry because of its central uniform thickness profile. A dog-bone shaped sample cut from a −1.00 power lens having a 0.522 inch length, 0.276 inch "ear" width and 0.213 inch "neck" width was loaded into the grips and elongated at a constant rate of strain of 2 inches per minute until it breaks. The center thickness of the dog-bone sample was measured using an electronic thickness gauge prior to testing. The initial gauge length of the sample (Lo) and sample length at break (Lf) were measured. At least five specimens of each composition were measured, and the average values were used to calculate the percent elongation to break: percent elongation=((Lf−Lo)/Lo)×100. The tensile modulus (M) was calculated as the slope of the initial linear portion of the stress-strain curve; the units of modulus are pounds per square inch or psi. The tensile strength (TS) was calculated from the peak load and the original cross-sectional area: tensile strength=peak load divided by the original cross-sectional area; the units of tensile strength are psi. Toughness was calculated from the energy to break and the original volume of the sample: toughness=energy to break divided by the original sample volume; the units of toughness are in-lbs/in3. The elongation to break (ETB) was also recorded as the percent strain at break.

PQ1 uptake (PQ1) was measured chromatographically. The HPLC was calibrated using a series of standard PQ1 solutions having concentrations 2, 4, 6, 8, 12 and 15 μg/mL. Lenses were placed into polypropylene contact lens cases with 3 mL of Optifree Replenish or similar lens solution (PQ1 concentration=10 micrograms/mL) which is commercially available from Alcon. A control lens case, containing 3 mL of solution, but no contact lens was also prepared. The lenses and control solutions were stored at room temperature for 72 hours. 1 mL of solution was removed from each of the samples and controls and mixed with trifluoroacetic acid (10 μL). The analysis was conducted using HPLC/ELSD and a Phenomenex Luna C5 (4.6 mm×5 mm; 5 μm particle size) column with the following equipment and conditions: Agilent 1200 HPLC or equivalent with an ELSD operating at T=100° C., Gain=12, Pressure=4.4 bar, Filter=3 s; ELSD parameters may vary from instrument to instrument; using mobile phase A of water (0.1% TFA) and mobile phase B of acetonitrile (0.1% TFA), a column temperature of 40° C. and an injection volume of 100 μL. An elution profile was used and listed in Table C. A calibration curve was created by plotting the peak area value as a function of the concentration of the PQ1 standard solutions. The concentration of PQ1 in a sample was then calculated by solving the quadratic equation representing the calibration curve. Three lenses were run for each analysis, and the results were averaged. PQ1 uptake was reported as the percentage loss of PQ1 after soak with lens compared to the PQ1 present in the control without lens.

TABLE C

| HPLC Elution Profile | | | |
|---|---|---|---|
| Time (minutes) | % A | % B | Flow Rate (mL/min) |
| 0.00 | 100 | 0 | 1.2 |
| 1.00 | 100 | 0 | 1.2 |
| 5.00 | 0 | 100 | 1.2 |
| 8.50 | 0 | 100 | 1.2 |
| 8.60 | 100 | 0 | 1.2 |
| 11.00 | 100 | 0 | 1.2 |

The amount of cholesterol absorbed by a contact lens was determined by a LC-MS method (Lipids). Lenses were soaked in a cholesterol solution and then extracted with dichloromethane. The dichloromethane extract was evaporated and reconstituted with a heptane/isopropanol mixture with subsequent analysis by LC-MS. The results were reported as micrograms of cholesterol per lens. A deuterated cholesterol internal standard was used to improve accuracy and precision of the method.

A cholesterol stock solution was prepared by placing 15.0±0.5 milligrams of cholesterol into a wide-mouth 10 mL glass volumetric flask followed by dilution with isopropanol.

A cholesterol soak solution was prepared by placing 0.430±0.010 grams of lysozyme (purity=93%), 0.200±0.010 grams of albumin, and 0.100±0.010 grams of β-lactoglobulin into a 200 mL glass volumetric flask, adding approximately 190 milliliters of PBS to the flask, and swirling to dissolve the contents. 2 Milliliters of the cholesterol stock solution was then added and diluted to volume with PBS. The volumetric flask was capped and shaken well. The concentration of the cholesterol soak solution was approximately 15 μg/mL. Note: The mass of these components may be adjusted to account for lot-to-lot purity variability so that the target concentrations can be achieved.

Six contact lenses were removed from their packages and blotted with lint-free paper towels to remove excess packing solution. The lenses were placed into six separate 8 mL glass vials (one lens per vial), and 3.0 mL of the cholesterol soak solution was added to each vial. The vials were capped and placed into a New Brunswick Scientific incubator-shaker for 72 hours at 37° C. and 100 rpm. After incubation, each lens was rinsed three times with PBS in 100 mL beakers and placed into a 20-mL scintillation vial.

To each lens-containing scintillation vial, 5 mL of dichloromethane and 100 μL of the internal standard solution were added. After a minimum of 16 hours of extraction time, the supernatant liquid was transferred into a 5 mL disposable glass culture tube. The tube was placed into the Turbovap and the solvent completely evaporated. Place 1 mL of the diluent into the culture tube and re-dissolve the contents. The aforementioned diluent was a 70:30 (v/v) mixture of heptane and isopropanol. The diluent was also the mobile phase. The resulting solution was carefully transferred into an autosampler vial and ready for LC-MS analysis.

An internal standard stock solution was prepared by weighing approximately 12.5+2 mg of deuterated cholesterol (2,2,3,4,4,6-$d_6$-cholesterol) in a 25 mL volumetric flask followed by dilution with the diluent. The concentration of the internal standard stock solution was approximately 500 μg/mL.

An internal standard solution was prepared by placing 1.0 mL of the internal standard stock solution in a 50 mL volumetric flask followed by dilution to volume with diluent. The concentration of this intermediate internal standard solution is approximately 10 μg/mL.

A reference standard stock solution was prepared by weighing approximately 50+5 mg of cholesterol in a 100 mL volumetric flask followed by dilution with diluent. The concentration of the cholesterol in this reference stock solution is approximately 500 μg/mL. Working standard solutions were then made according to Table D by placing the appropriate amount of standard solutions into the listed 25 mL, 50 mL or 100 mL volumetric flasks. After the standard solutions were added to the volumetric flasks, the mixture was diluted to volume with diluent and swirled well.

TABLE D

Working Standard Solution Formulations

| Working Standard Name | Volume of Internal Standard Solution (mL) | Volume of Reference Standard Stock Solution (μL) | Final Volume (mL) | Approximate Cholesterol Concentration (μg/mL) |
|---|---|---|---|---|
| Std 1 | 10 | 20 | 100 | 0.10 |
| Std 2 | 5 | 25 | 50 | 0.25 |
| Std 3 | 5 | 50 | 50 | 0.50 |
| Std 4 | 5 | 100 | 50 | 1.00 |
| Std 5 | 2.5 | 125 | 25 | 2.50 |
| Std 6 | 2.5 | 250 | 25 | 5.00 |

The following LC-MS analysis was performed: Make 6 injections of the "Std4" to evaluate system suitability. The RSD % of the peak areas for the working standards and the internal standards must be <5% and RSD % of their peak area ratios must be <7% to pass system suitability. Inject working standards 1-6 to create a calibration curve. The square of the correlation coefficient ($r^2$) must be >0.99. Inject test samples followed by a bracketing standard (Std4). The peak area ratio of the bracketing standard must be within +10% of the averaged peak area ratio from the system suitability injections.

A calibration curve was constructed by plotting the peak area ratio (reference std/internal std) value that corresponds to the concentration of each working standard solution. The concentration of cholesterol in sample is calculated by solving a quadratic equation and is expressed in micrograms per lens or μg/lens. Typical equipment and their settings for the LC-MS analysis are listed below and shown in Tables E and F. The values for the instrument tune parameters may change each time the mass spectrometer is tuned.

Turbovap Conditions:

Temperature: 45° C.

Time: 30 minutes or more to dryness

Gas: nitrogen @ 5 psi

HPLC Conditions:

HPLC: Thermo Accela HPLC Instrument or equivalent

HPLC Column: Agilent Zorbax NH2 (4.6 mm×150 mm; 5 μm particle size)

Mobile Phase: 70% heptane and 30% isopropanol

Column Temperature: 30° C.

Injection Volume: 25 μL

Flow Rate: 1000 μL/min

TABLE E

Mass Spectrometry Conditions
Thermo Finnigan TSQ Quantum Ultra

| MS Settings | Value |
|---|---|
| Ionization | APCI |
| Polarity | Positive |
| Scan type | SIM |
| APCI probe position | D |
| Mass (m/z) of Reference Standards | 369.2 |
| Mass (m/z) of Internal Standards | 375.3 |
| Mass width (m/z) | 1.0 |
| Scan time (s) | 0.10 |
| Data type | centroid |
| Peak Width Q3 (FWHM) | 0.40 |
| Skimmer Offset (V) | 10 |

TABLE F

| Tune Parameters | |
|---|---|
| Instrument Tune Parameters | Value |
| Discharge Current (arbitrary units): | 20 |
| Capillary temperature (° C.): | 240 |
| Vaporizer Temperature (° C.): | 500 |
| Tube lens offset (V): | 68 |
| Sheath gas pressure (arbitrary units): | 20 |
| Auxiliary gas flow (arbitrary units): | 15 |

Fourier Transform Infrared (FTIR) spectra were measured using a Thermo Scientific Nicolet iS50 instrument. Transmission FTIR spectra were measured by mounting the lens into the sample chamber so that the beam passed through the center of the lens, thereby yielding bulk or overall compositional information. Attenuated total reflectance (ATR) FTIR spectra were measured using a standard diamond ATR crystal (450 angle of incidence), thereby yielding surface compositional information. Peak height analysis was performed using the Thermo Scientific Omnic software.

Sample Preparation: Prior to performing either transmission or ATR FTIR analysis, the test lenses are soaked in deuterated saline for 1 hour. Exchanging water for deuterium oxide shifts the water bands in the FTIR spectrum to provide a clear spectral region for observing the amide carbonyl region of the spectrum. Deuterated saline is prepared according to ISO-10344 using deuterium oxide instead of water. After removal from the deuterated saline, the test lens is analyzed by either transmission or ATR analysis. For transmission analysis, a 4 mm disk is cut from the center of the lens (thickness ~100 μm) using a biopsy punch. The excised lens section is placed in a (2.5 mm) diamond compression cell and tightened to thin the sample and thereby allow transmission of the FTIR beam through the material. The degree of compression is such that the spectral peaks of interest have an intensity of less than 2 absorbance units. A beam condenser is used to create a narrow beam waist thereby allowing a larger portion of the FTIR beam to penetrate the sample. For ATR analysis the center of an uncut lens is placed on the diamond ATR crystal and held in place with a standard pressure clamp. A 7-millimeter diameter Teflon disc (thickness 0.81 millimeters) is placed between the pressure clamp and lens prior to clamping.

Data Acquisition: Before analysis, a background scan is performed using either an empty compression cell or a clean ATR crystal without a lens sample. All contact lens spectra are corrected for these background absorbances using the usual correction procedure. Spectra are acquired by averaging 16 scans over the wavenumber range 400 to 4000 cm$^{-1}$ using a resolution of 4 cm$^{-1}$.

Infrared absorption bands were identified for the following functional groups: ester carbonyl at 1715 cm$^{-1}$ (corresponding methacrylate or acrylate), cyclic amide carbonyl at 1657 cm$^{-1}$ (corresponding to PVP), acyclic amide carbonyl at 1618 cm$^{-1}$ (corresponding to DMA), branched silicone at 840 cm$^{-1}$ (corresponding to SiMAA), and linear silicone at 796 cm$^{-1}$ (corresponding to mPDMS). In general, an absorption band is chosen as an internal standard. For example, the linear silicone band at 796 cm$^{-1}$ may be chosen or the (meth)acrylate absorption band at 1715 cm$^{-1}$ may be chosen. Then, changes in concentration of a functional group as a surrogate for changes in concentration of a polymerized reactive monomer mixture component or a polymeric ingredient can be measured by comparing the ratios of band heights of the function group (or component) band divided by the band height of the internal standard band from sample to sample. For example, the FTIR absorption band ratio of PVP to linear silicone (denoted in the figures as PVP/Silicone Ratio and representing molar ratios) can be used to compare the relative concentrations of PVP between samples. Similarly, the FTIR absorption band ratio of PVP to (meth)acrylate (denoted in the figures as PVP/Methacrylate Ratio) can also be used to compare the relative concentrations of PVP between samples. ATR FTIR bands are used to compare surface concentrations; transmission FTIR bands are used to compare bulk concentrations. In a series of samples or contact lenses, one sample or lens may be chosen as the benchmark standard and its ratio assigned an arbitrary number, say 100, and the other samples in the series may then be normalized to the benchmark standard to facilitate comparisons. Since the constituents of the benchmark lens used for normalization in the following examples (a photochemically cured lens) are substantially homogenously distributed in the lens, comparisons of the relative concentrations of constituents in the surface and bulk of the test lenses, such as the thermally cured lenses, as well as comparisons between thermally and photochemically cured lenses, may be made.

The levels of residual monomer and macromer were determined at various times during the thermal polymerization by high performance liquid chromatography using ultraviolet detection (HPLC/UV). The cured lenses were removed from the oven, demolded, weighed, and extracted with 5 mL of a 90:10 (v/v) methanol/isopropanol solution by sonicating for 1 hr in a temperature controlled water bath, typically 3 lenses were immersed in 5 mL of mixed solvent. The extracts were analyzed as described below. If the concentrations of residuals were outside of the calibration range, then the extracts were diluted with methanol to render the concentration with the calibration range for accurate quantitation.

For DMA, HEMA, and TEGDMA, a stock solution was prepared by dissolving 0.1000 gram of each component in a 100 mL volumetric flash with enough 90:10 (v/v) methanol/isopropanol solution to fill the flask to the line. This stock solution was then diluted to make calibration samples (in part serially) having the following concentrations: 500, 200, 100, 50, 20, 10, 5, 1, and 0.5 micrograms per milliliter (μg/mL). These calibration samples were used to generate a calibration curve for the HPLC-UV analysis. The chromatographic conditions used for the DMA, HEMA, and TEGDMA analysis are listed below.

Chromatographic Conditions
    Column: Agilent Zorbax Eclipse Plus 18, 4.6×75 mm×1.8 μm
    Phenomenex Security Guard Cartridge
    Column Temperature: 30° C.
    UV Detector: 217 nm
    Injection Volume: 5 μL
    Mobile Phase (Gradient Mobile Phase Listed in Table G (v/v))
    Eluent A: De-ionized water with 0.05% $H_3PO_4$
    Eluent B: Acetonitrile with 0.05% $H_3PO_4$
    Eluent C: Methanol
    Flow Rate: 1 mL/min

TABLE G

| Gradient Mobile Phase | | | |
|---|---|---|---|
| Time (minutes) | % A | % B | % C |
| 0 | 95 | 5 | 0 |
| 3 | 95 | 5 | 0 |
| 10 | 50 | 50 | 0 |
| 13 | 50 | 50 | 0 |
| 15 | 0 | 10 | 90 |

TABLE G-continued

| Gradient Mobile Phase | | | |
|---|---|---|---|
| Time (minutes) | % A | % B | % C |
| 16 | 95 | 5 | 0 |
| 21 | 95 | 5 | 0 |
| 35 | 95 | 5 | 0 |

At each time point, the concentration of DMA, HEMA, and TEGDMA in the lens extract was determined (μg/mL). These extract concentrations were then used to calculate the amount of these components in the sample, expressed as a percentage of the sample weight, as follows: % Component= [(μg/mL*Volume of Extract*Dilution Factor*$10^{-6}$ g/μg)/(g Sample Weight)]*100. Finally, the percentage of unreacted component, expressed as a percentage relative to $T_0$, was calculated using the following formula: % at $T_x$=(% Measured at $T_x$/% Measured at $T_0$)*100 (wherein $T_0$ represents 100% unreacted component or at reaction time zero and $T_x$ represents the amount of unreacted component at time point x).

For Norbloc and SiMAA, a stock solution was prepared by dissolving 0.0500 gram of Norbloc and 0.1000 gram of SiMAA in a 100 mL volumetric flask with enough 90:10 (v/v) methanol/isopropanol solution to fill the flask to the line. This stock solution was then diluted to make calibration samples (in part serially) having the following concentrations: 250, 100, 50, 25, 10, 5, 2.5, 0.5, and 0.25 micrograms per milliliter (μg/mL) for Norbloc and 1000, 400, 200, 100, 40, 20, 10, 2, and 1 micrograms per milliliter (μg/mL) for SiMAA. These calibration samples were used to generate calibration curves for the HPLC-UV analysis. The chromatographic conditions used for the Norbloc and SiMAA analysis are listed below.

Chromatographic Conditions
    Column: Agilent Zorbax Eclipse Plus 18, 4.6×75 mm×1.8 μm
    Phenomenex Security Guard Cartridge
    Column Temperature: 30° C.
    UV Detector: 217 nm
    Injection Volume: 5 μL
    Mobile Phase (Gradient Mobile Phase Listed in Table H (v/v))
    Eluent A: De-ionized water with 0.05% $H_3PO_4$
    Eluent B: Acetonitrile with 0.05% $H_3PO_4$
    Eluent C: 50:50 (v/v) Methanol/Isopropanol
    Flow Rate: 1 mL/min

TABLE H

| Gradient Mobile Phase | | | |
|---|---|---|---|
| Time (minutes) | % A | % B | % C |
| 0 | 30 | 70 | 0 |
| 8 | 30 | 70 | 0 |
| 11 | 0 | 100 | 0 |
| 12 | 0 | 80 | 20 |
| 15 | 0 | 80 | 20 |
| 16 | 30 | 70 | 0 |
| 21 | 30 | 70 | 0 |

At each time point, the concentration of Norbloc and SiMAA in the lens extract was determined (μg/mL). These extract concentrations were then used to calculate the amount of these components in the sample, expressed as a percentage of the sample weight, as follows: % Component= [(μg/mL*Volume of Extract*Dilution Factor*$10^{-6}$ g/μg)/(g Sample Weight)]*100. Finally, the percentage of unreacted component, expressed as a percentage relative to $T_0$, was calculated using the following formula: % at $T_x$=(% Measured at $T_x$/% Measured at $T_0$)*100 (wherein $T_0$ represents 100% unreacted component or at reaction time zero and $T_x$ represents the amount of unreacted component at time point x).

For mPDMS, a stock solution was prepared by dissolving 0.2000 gram of mPDMS in a 100 mL volumetric flash with enough 90:10 (v/v) methanol/isopropanol solution to fill the flask to the line. This stock solution was then diluted to make calibration samples (in part serially) having the following concentrations: 1000, 400, 200, 100, 40, 20, 10, 2, and 1 micrograms per milliliter (μg/mL). These calibration samples were used to generate a calibration curve for the HPLC-UV analysis. The chromatographic conditions used for mPDMS analysis are listed below.

Chromatographic Conditions
    Column: Agilent Zorbax Eclipse XDB18, 4.6×50 mm×1.8 μm
    Phenomenex Security Guard Cartridge
    Column Temperature: 30° C.
    UV Detector: 217 nm
    Injection Volume: 20 μL
    Mobile Phase (Gradient Mobile Phase Listed in Table I (v/v))
    Eluent A: De-ionized water
    Eluent B: Acetonitrile
    Eluent C: Isopropanol
    Flow Rate: 1 mL/min

TABLE I

| Gradient Mobile Phase | | | |
|---|---|---|---|
| Time (minutes) | % A | % B | % C |
| 0 | 50 | 48 | 2 |
| 0.5 | 50 | 48 | 2 |
| 2 | 0 | 60 | 40 |
| 5 | 0 | 60 | 40 |
| 5.1 | 0 | 70 | 30 |
| 8 | 0 | 70 | 30 |
| 8.1 | 50 | 48 | 2 |
| 10 | 50 | 48 | 2 |

At each time point, the concentration of mPDMS in the lens extract was determined (μg/mL). These extract concentrations were then used to calculate the amount of mPDMS in the sample, expressed as a percentage of the sample weight, as follows: % mPDMS=[(μg/mL*Volume of Extract*Dilution Factor*$10^{-6}$ g/μg)/(g Sample Weight)]*100. Finally, the percentage of unreacted mPDMS, expressed as a percentage relative to $T_0$, was calculated using the following formula: % at $T_x$=(% Measured at $T_x$/% Measured at $T_0$)*100 (wherein $T_0$ represents 100% unreacted mPDMS or at reaction time zero and $T_x$ represents the amount of unreacted mPDMS at time point x).

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

The following abbreviations will be used throughout the Examples and have the following meanings:
RMM: reactive monomer mixture
L: liter(s)
mL: milliliter(s)
nm: nanometer(s)
g: gram(s)
µg: microgram(s)
Da: dalton or grams/mole
kDa: kilodaltons
FTIR: Fourier Transform Infrared spectroscopy
ATR: Attenuated Total Reflectance
HPLC: high performance liquid chromatography
UV: ultraviolet spectroscopy
WC: water content (weight %)
EC Dk: edge-corrected oxygen gas permeability (barrers)
M: modulus (psi)
TS: tensile strength (psi)
ETB: elongation to break (%)
RI: refractive index
Sessile Drop: advancing contact angle (degrees)
Cahn DCA: advancing and receding contact angles (degrees)
BC: base or back curve plastic mold made of PP, TT, Z, or blends thereof
FC: front curve plastic mold made of PP, TT, Z, or blends thereof
PP: polypropylene which is the homopolymer of propylene
TT: Tuftec which is a hydrogenated styrene butadiene block copolymer (Asahi Kasei Chemicals)
Z: Zeonor which is a polycycloolefin thermoplastic polymer (Nippon Zeon Co Ltd)
TL03 lights: Phillips TLK 40 W/03 bulbs
LED: light emitting diode
DMA: N, N-dimethylacrylamide (Jarchem)
HEMA: 2-hydroxyethyl methacrylate (Bimax)
PVP K90: poly(N-vinylpyrrolidone) (ISP Ashland)
PVMA: polyvinylmethyacetamide
TEGDMA: tetraethylene glycol dimethacrylate (Esstech)
mPDMS: mono-n-butyl terminated monomethacryloxypropyl terminated polydimethylsiloxane (Mn=800-1500 daltons) (Gelest)
SiMAA: 2-propenoic acid, 2-methyl-2-hydroxy-3-[3-[1,3,3,3-tetramethyl-1-[(trimethylsilyl)oxy]disiloxanyl]propoxy]propyl ester (Toray) or 3-(3-(1,1,1,3,5,5,5-heptamethyltrisiloxan-3-yl)propoxy)-2-hydroxypropyl methacrylate or 2-hydroxy-3-[3-methyl-3,3-di(trimethylsiloxy)silylpropoxy]-propyl methacrylate Irgacure or Omnirad 184: 1-Hydroxy-cyclohexyl-phenyl-ketone (IGM Resins, BASF or Ciba Specialty Chemicals)
Irgacure or Omnirad 1870: blend of bis(2,6-dimethoxybenzoyl)-2,4,4-trimethyl-pentylphosphineoxide and 1-hydroxy-cyclohexyl-phenyl-ketone (BASF or Ciba Specialty Chemicals)
AIBN: Azobisisobutyronitrile or 2,2'-Azobis(2-methylpropionitrile), 2-(azo(1-cyano-1-methylethyl))-2-methylpropane nitrile
Norbloc: 2-(2'-hydroxy-5-methacrylyloxyethylphenyl)-2H-benzotriazole (Janssen)
Blue HEMA: 1-amino-4-[3-(4-(2-methacryloyloxyethoxy)-6-chlorotriazin-2-ylamino)-4-sulfophenylamino]anthraquinone-2-sulfonic acid, as described in U.S. Pat. No. 5,944,853
D3O: 3,7-dimethyl-3-octanol (Vigon)
DIW: deionized water
IPA: isopropyl alcohol
PS: Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask.
WC: water content (weight %)
Haze: %
EC Dk: edge-corrected oxygen gas permeability (barrers)
M: modulus (psi)
TS: tensile strength (psi)
ETB: elongation to break (%)
Lipids: micrograms of cholesterol per lens or µg/lens
RI: refractive index
Sessile Drop: advancing contact angle (degrees)
Cahn DCA: advancing and receding contact angles (degrees) in that order in the tables
Parentheses: parentheses ( ) in the tables are used to denote the standard deviation of the measurement Preparation 1—Polyvinylmethyacetamide (PVMA)

PVMA was prepared as follows: 380 mL (3.48 mol) of distilled N-vinyl-N-methyl acetamide and 187 mg (1.14 mmol) of azobisisobutyronitrile were added to a 3-neck round bottom flask fitted with reflux condenser, magnetic stirring bar and thermocouple and purged of oxygen gas for 2 hours by bubbling nitrogen gas through the reaction mixture. Then, the reaction mixture was heated at 75° C. for 24 hours during which time the reaction mixture solidified. The reaction product was quenched in air and isolated by work-up procedure 1 or work-up procedure 2. Work-up Procedure: The reaction product was dissolved in water and dialyzed extensively in dialysis membrane tubing (Spectra Pore MWCO 3500) and freeze dried (60% yield) (LAB-CONCO, Freezone® Triad™ freeze dry system, Model #7400030). The molecular weight was determined by Size Exclusion Chromatography with Multi-Angle Light Scattering (SEC-MALS). The SEC-MALS setup employed aqueous acetonitrile solution as the mobile phase composed of 80% (v/v) 50 mM $Na_2SO_4$ and 20% (v/v) acetonitrile at a flow rate of 0.5 mL/min at 40° C. Two Tosoh Biosciences TSK-gel columns in series were used [SuperAW4000 and SuperAW5000] with an online Agilent 1200 UV/VIS diode array detector, a Wyatt Optilab rEX interferometric refractometer, and a Wyatt mini-DAWN Treos multiangle laser scattering (MALS) detector ($\lambda$=658 nm). Absolute molecular weights and polydispersity data were calculated using the Wyatt ASTRA VI SEC/LS software package. About 40 milligrams of PVMA were dissolved in packing solution in a 10 mL volumetric flask. Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask. Three different solutions were prepared and tested. All solutions were filtered through a 0.45-micron nylon membrane filter prior to injection into the SEC-MALS system. The number average molecular weight of the three samples was 290.5 kDa; the weight average molecular weight of the three samples was 570.3 kDa; resulting in a polydispersity index of 1.96.

Examples 1-9

Reactive monomer mixtures were prepared composed of 77 weight percent of the formulations listed in Table 1, and 23 weight percent of the diluent D3O. The reactive monomer mixtures were individually filtered through a 3 µm filter using a stainless-steel syringe. Then, at the time of use, about 0.074 grams of AIBN (thermal initiator) were dissolved in 20.0000 grams of RMM. The weight percent of AIBN was about 0.37 weight percent in the final RMM.

The RMMs with AIBN were degassed at ambient temperature by applying vacuum (40 torr) for at least 20 minutes. Then, in a glove box with a nitrogen gas atmosphere and less than about 0.2 percent oxygen gas, about 75-80 μL of the reactive mixture were dosed using an Eppendorf pipet at room temperature into the FC made of Zeonor. The BC made of 55:45 (w/w) Z:PP blend was then placed onto the FC. The molds were equilibrated for a minimum of twelve hours in the glove box prior to dosing. About 20 pallets each containing eight mold assemblies were transferred into an adjacent oven maintained at about 65-70° C. and located within the glove box, and the lenses were cured under these conditions for about 24 hours.

The lenses were manually de-molded and released by suspending the lenses in about one liter of 70 percent IPA for at least 12 hours, followed by soaking two more times with about 450 mL fresh 70 percent IPA for about 45 minutes; then one time with fresh DIW for about 45 minutes; then one time with packing solution for about 45 minutes. The lenses were equilibrated and stored in borate buffered packaging solution prior to autoclaving at 121° C. for 30 minutes in vials. Various physical and mechanical properties of the sterile lenses were determined which are listed in Table 2.

A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels.

TABLE 1

Formulation Components

| Component (weight %) | Ex 1 | Ex 2 | Ex 3 | Ex 4 | Ex 5 | Ex 6 | Ex 7 | Ex 8 |
|---|---|---|---|---|---|---|---|---|
| mPDMS | 31.15 | 31.14 | 31.14 | 31.13 | 31.14 | 31.15 | 31.16 | 31.05 |
| SiMAA | 28.13 | 28.11 | 28.13 | 28.12 | 28.14 | 28.14 | 28.18 | 28.08 |
| DMA | 31.13 | 30.63 | 30.15 | 29.64 | 29.15 | 28.64 | 27.12 | 25.74 |
| HEMA | 6.03 | 6.05 | 6.04 | 6.04 | 6.03 | 6.03 | 6.04 | 6.01 |
| Blue HEMA | 0.03 | 0.03 | 0.03 | 0.03 | 0.03 | 0.02 | 0.03 | 0.03 |
| TEGDMA | 1.53 | 1.51 | 1.51 | 1.52 | 1.50 | 1.51 | 1.46 | 1.52 |
| PVP K90 | 0 | 0.50 | 1.00 | 1.52 | 2.02 | 2.50 | 4.01 | 5.56 |
| Norbloc | 2.01 | 2.03 | 2.02 | 2.02 | 1.98 | 2.01 | 2.01 | 2.02 |
| Total | 100 | 100 | 100 | 100 | 100 | 100 | 100 | 100 |

TABLE 2

Lens Properties

| | Weight % PVP K90 | Cahn DCA | Sessile Drop | Water Content | Haze | Mechanicals | | | Lipids | RI |
|---|---|---|---|---|---|---|---|---|---|---|
| | | | | | | Modulus | ETB | EC Dk | | |
| Ex 1 | 0.0 | 119 (15), 31 (19) | 106 (4) | 31 (0) | 10 (2) | 107 (17) | 163 (50) | 129 | — | 1.4475 (0.0033) |
| Ex 2 | 0.5 | 104 (16), 15 (19) | 106 (2) | 32 (0) | 2 (1) | 115 (13) | 173 (50) | 102 | 9.20 (1.28) | 1.4359 (0.0032) |
| Ex 3 | 1.0 | 89 (15), 19 (13) | 92 (8) | 33 (0) | 5 (1) | 102 (15) | 193 (29) | 107 | 8.09 (1.21) | 1.4315 (0.0019) |
| Ex 4 | 1.5 | 61 (16), 16 (17) | 95 (6) | 32 (1) | 4 (0) | 109 (9) | 197 (51) | 110 | 9.96 (2.03) | 1.4265 (0.0020) |
| Ex 5 | 2.0 | 19 (18), 16 (13) | 58 (14) | 34 (0) | 2 (0) | 106 (9) | 175 (40) | 120 | 8.87 (2.10) | 1.4237 (0.0015) |
| Ex 6 | 2.5 | 32 (9), 31 (19) | 65 (5) | 34 (0) | 3 (1) | 102 (15) | 170 (32) | 94 | 8.30 (2.19) | 1.4167 (0.0027) |
| Ex 7 | 4.0 | 31 (7), 30 (14) | 51 (3) | 35 (0) | 5 (1) | 107 (12) | 177 (33) | 105 | 6.06 (1.17) | 1.4149 (0.0017) |
| Ex 8 | 5.6 | 42 (11), 26 (9) | 51 (9) | 36 (0) | 6 (1) | 113 (9) | 205 (28) | 116 | 6.24 (1.01) | 1.4193 (0.0015) |

As shown in Table 2, lenses that were made by thermal curing exhibited good wettability as measured by Cahn DCA and Sessile Drop at low levels of the internal wetting agent PVP K90 while maintaining a good balance of physical and mechanical properties suitable for soft contact lenses.

Comparative Example 1

A reactive monomer mixture was prepared composed of 77 weight percent of the formulation listed in Table 3, and 23 weight percent of the diluent D3O. Then, 0.0524 grams of Irgacure 1870 and 0.0215 grams of Irgacure 184 were dissolved in 20 grams of this reactive monomer mixture by stirring overnight and then filtered through a 3 m filter using a stainless-steel syringe.

The RMM was degassed at ambient temperature by applying vacuum (40 torr) for at least 20 minutes. Then, in a glove box with a nitrogen gas atmosphere and less than about 0.2 percent oxygen gas, about 75 µL of the reactive mixture were dosed using an Eppendorf pipet at room temperature into the FC made of Zeonor. The BC made of 55:45 (w/w) Z:PP blend was then placed onto the FC. The molds were equilibrated for a minimum of twelve hours in the glove box prior to dosing. Pallets each containing eight mold assemblies were transferred into an adjacent glove box maintained at 64° C., and the lenses were cured from the top for 12 minutes using TL03 lamps having an intensity of about 4.5 mW/cm$^2$ at the tray's location.

The lenses were manually de-molded with most lenses adhering to the FC and released by suspending the lenses in about one liter of 70 percent IPA for at least 12 hours, followed by soaking two more times with about 450 mL fresh 70 percent IPA for about 45 minutes; then one time with fresh DIW for about 45 minutes; then one time with packing solution for about 45 minutes. The lenses were equilibrated and stored in borate buffered packaging solution prior to autoclaving at 121° C. for 30 minutes in vials. Various physical and mechanical properties of the sterile lenses were determined which are listed in Table 4.

A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels.

Comparative Example 2

A reactive monomer mixture was prepared composed of 77 weight percent of the formulation listed in Table 3, and 23 weight percent of the diluent D3O. Then, 0.0391 grams of Irgacure 1870 and 0.0157 grams of Irgacure 184 were dissolved in 15 grams of this reactive monomer mixture by stirring overnight and then filtered through a 3 µm filter using a stainless-steel syringe.

The RMM was degassed at ambient temperature by applying vacuum (40 torr) for at least 20 minutes. Then, in a glove box with a nitrogen gas atmosphere and less than about 1 percent oxygen gas, about 75 µL of the reactive mixture were dosed using an Eppendorf pipet at room temperature into the FC made of Zeonor. The BC made of 55:45 (w/w) Z:PP blend was then placed onto the FC. The molds were equilibrated for a minimum of twelve hours in the glove box prior to dosing. Pallets each containing eight mold assemblies each were transferred into an adjacent glove box maintained at 64° C., and the lenses were cured from the top for 15 minutes using 435 nm LED lights having an intensity of about 4 mW/cm$^2$ at the tray's location.

The lenses were manually de-molded with most lenses adhering to the FC and released by suspending the lenses in about one liter of 70 percent IPA for at least 12 hours, followed by soaking two more times with about 450 mL fresh 70 percent IPA for about 45 minutes; then one time with fresh DIW for about 45 minutes; then one time with packing solution for about 45 minutes. The lenses were equilibrated and stored in borate buffered packaging solution prior to autoclaving at 121° C. for 30 minutes in vials. Various physical and mechanical properties of the sterile lenses were determined which are listed in Table 4.

A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels.

TABLE 3

Formulation Components and Curing System

| Component (weight %) | Ex 6 Thermal | Comparative Ex 1 Cure TL03 | Comparative Ex 2 LED 435 nm |
|---|---|---|---|
| mPDMS | 31.15 | 31.15 | 31.15 |
| SiMAA | 28.14 | 28.14 | 28.14 |
| DMA | 28.64 | 28.64 | 28.64 |
| HEMA | 6.03 | 6.03 | 6.03 |
| Blue HEMA | 0.02 | 0.02 | 0.02 |
| TEGDMA | 1.51 | 1.51 | 1.51 |
| PVP K90 | 2.50 | 2.50 | 2.50 |
| Norbloc | 2.01 | 2.01 | 2.01 |
| Total | 100 | 100 | 100 |

TABLE 4

| | Lens Properties | | | | | | | | |
|---|---|---|---|---|---|---|---|---|---|
| | Weight % PVP K90 | Cahn DCA | Sessile Drop | Water Content | Haze | Mechanicals Modulus | ETB | EC Dk | RI |
| Ex 6 Thermal | 2.5 | 32 (9), 31 (19) | 65 (5) | 34 (0) | 3 (1) | 102 (15) | 170 (32) | 94 | 1.4167 (0.0027) |
| Comp Ex 1 TL03 | 2.5 | 105 (6), 27 (6) | 101 (3) | 35 (0) | 5 (1) | 98 (13) | 259 (28) | 91 | 1.4269 (0.0001) |

TABLE 4-continued

|  | Weight % | Cahn | Sessile | Water |  | Mechanicals | | | |
|---|---|---|---|---|---|---|---|---|---|
|  | PVP K90 | DCA | Drop | Content | Haze | Modulus | ETB | EC Dk | RI |
| Comp Ex 2 435 nm LED | 2.5 | 85 (18), 26 (1) | 99 (4) | 35 (1) | 4 (1) | 114 (12) | 208 (54) | 100 | 1.4265 (0.0014) |

As shown in Table 4, lenses that were made by thermal curing exhibited good wettability as measured by Cahn DCA and Sessile Drop at low levels of the internal wetting agent PVP K90 while maintaining a good balance of physical and mechanical properties suitable for soft contact lenses, while the photochemically cured lenses were significantly less wettable as measured by advancing Cahn DCA and Sessile Drop.

Examples 8-11

Reactive monomer mixtures were prepared composed of 77 weight percent of the formulations listed in Table 5, and 23 weight percent of the diluent D3O. PVMA from Preparation 1 was used. The reactive monomer mixtures were individually filtered through a 3 µm filter using a stainless-steel syringe. Then, at the time of use, about 0.037 grams of AIBN (thermal initiator) were dissolved in 10.0000 grams of RMM. The weight percent of AIBN was about 0.37 weight percent in the final RMM.

The RMM with AIBN were degassed at ambient temperature by applying vacuum (40 torr) for at least 20 minutes. Then, in a glove box with a nitrogen gas atmosphere and less than about 0.2 percent oxygen gas, about 70-75 µL of the reactive mixture were dosed using an Eppendorf pipet at room temperature into the FC made of Zeonor. The BC made of 55:45 (w/w) Z:PP blend was then placed onto the FC. The molds were equilibrated for a minimum of twelve hours in the glove box prior to dosing. About 20 pallets each containing eight mold assemblies were transferred into an adjacent oven maintained at about 65-70° C. and located within the glove box, and the lenses were cured under these conditions for about 24 hours.

The lenses were manually de-molded and released by suspending the lenses in about one liter of 70 percent IPA for at least 12 hours, followed by soaking two more times with about 450 mL fresh 70 percent IPA for about 45 minutes; then one time with fresh DIW for about 45 minutes; then one time with packing solution for about 45 minutes. The lenses were equilibrated and stored in borate buffered packaging solution prior to autoclaving at 121° C. for 30 minutes in vials. Various physical and mechanical properties of the sterile lenses were determined which are listed in Table 6.

A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels.

TABLE 5

| | Formulation Components | | | |
|---|---|---|---|---|
| Component (weight %) | Ex 8 | Ex 9 | Ex 10 | Ex 11 |
| mPDMS | 31.14 | 31.14 | 31.13 | 31.16 |
| SiMAA | 28.12 | 28.13 | 28.12 | 28.13 |
| DMA | 29.62 | 29.14 | 28.64 | 27.14 |
| HEMA | 6.03 | 6.03 | 6.02 | 6.03 |
| Blue HEMA | 0.03 | 0.03 | 0.03 | 0.03 |
| TEGDMA | 1.51 | 1.51 | 1.51 | 1.50 |
| PVMA | 1.53 | 2.02 | 2.54 | 4.00 |
| Norbloc | 2.02 | 2.01 | 2.03 | 2.02 |
| Total | 100 | 100 | 100 | 100 |

TABLE 6

| | Lens Properties | | | | | | | | | |
|---|---|---|---|---|---|---|---|---|---|---|
| | Weight % | Cahn | Sessile | Water | | Mechanicals | | | | |
| | PVMA | DCA | Drop | Content | Haze | Modulus | ETB | EC Dk | Lipids | RI |
| Ex 8 | 1.5 | 56 (15), 16 (11) | 86 (7) | 34 (0) | 5 (1) | 132 (9) | 220 (28) | 110 | 5.45 (1.03) | 1.4262 (0.0002) |
| Ex 9 | 2 | 21 (10), 25 (10) | 72 (6) | 33 (0) | 4 (0) | 126 (7) | 218 (30) | 103 | 4.81 (0.29) | 1.4223 (0.0002) |
| Ex 10 | 2.5 | 22 (13), 14 (14) | 46 (16) | 36 (0) | 5 (1) | 114 (8) | 204 (31) | 93 | 4.75 (0.29) | 1.4195 (0.0004) |
| Ex 11 | 4 | 11 (9), (0) | 33 (3) | 35 (0) | 6 (1) | 115 (13) | 199 (55) | 116 | 4.55 (0.71) | 1.4179 (0.0006) |

As shown in Table 6, lenses that were made by thermal curing exhibited good wettability as measured by Cahn DCA and Sessile Drop at low levels of the internal wetting agent PVMA while maintaining a good balance of physical and mechanical properties suitable for soft contact lenses.

Comparative Examples 3-6

Reactive monomer mixtures were prepared composed of 77 weight percent of the formulations listed in Table 7 and 23 weight percent of the diluent D3O. Then, about 0.0655 grams of Irgacure 1870 and about 0.0270 grams of Irgacure 184 were dissolved in 25 grams of these reactive monomer mixtures by stirring overnight and then filtered through a 3 µm filter using a stainless-steel syringe.

The RMM was degassed at ambient temperature by applying vacuum (40 torr) for at least 20 minutes. Then, in a glove box with a nitrogen gas atmosphere and less than about 0.2 percent oxygen gas, about 70-75 µL of the reactive mixture were dosed using an Eppendorf pipet at room temperature into the FC made of Zeonor. The BC made of 55:45 (w/w) Z:PP blend was then placed onto the FC. The molds were equilibrated for a minimum of twelve hours in the glove box prior to dosing. Pallets each containing eight mold assemblies each were transferred into an adjacent glove box maintained at 65° C., and the lenses were cured from the top for 12 minutes using TLO3 lamps having an intensity of about 4.0-4.5 mW/cm² at the tray's location.

The lenses were manually de-molded with most lenses adhering to the FC and released by suspending the lenses in about one liter of 70 percent IPA for at least 12 hours, followed by soaking two more times with about 450 mL fresh 70 percent IPA for about 45 minutes; then one time with fresh DIW for about 45 minutes; then one time with packing solution for about 45 minutes. The lenses were equilibrated and stored in borate buffered packaging solution prior to autoclaving at 121° C. for 30 minutes in vials. Various physical and mechanical properties of the sterile lenses were determined which are listed in Table 8.

A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels.

TABLE 7

Formulation Components

| Component (weight %) | Comp Ex 3 | Comp Ex 4 | Comp Ex 5 | Comp Ex 6 |
| --- | --- | --- | --- | --- |
| mPDMS | 31.14 | 31.14 | 31.13 | 31.16 |
| SiMAA | 28.12 | 28.13 | 28.12 | 28.13 |
| DMA | 29.62 | 29.14 | 28.64 | 27.14 |
| HEMA | 6.03 | 6.03 | 6.02 | 6.03 |
| Blue HEMA | 0.03 | 0.03 | 0.03 | 0.03 |
| TEGDMA | 1.51 | 1.51 | 1.51 | 1.50 |
| PVMA | 1.53 | 2.02 | 2.54 | 4.00 |
| Norbloc | 2.02 | 2.01 | 2.03 | 2.02 |
| Total | 100 | 100 | 100 | 100 |

TABLE 8

Lens Properties

| | Weight % PVMA | Cahn DCA | Sessile Drop | Water Content | Haze | Mechanicals Modulus | ETB | EC Dk | Lipids | RI |
| --- | --- | --- | --- | --- | --- | --- | --- | --- | --- | --- |
| Comp Ex 3 | 1.5 | 102 (14), 34 (10) | 95 (8) | 34 (0) | 5 (1) | 100 (5) | 256 (29) | 100 | 8.57 (2.48) | 1.4278 (0.0001) |
| Comp Ex 4 | 2 | 104 (8), 34 (7) | 90 (11) | 37 (0) | 4 (0) | 109 (7) | 245 (20) | 90 | 8.39 (1.11) | 1.4256 (0.0009) |
| Comp Ex 5 | 2.5 | 77 (44), 17 (17) | 102 (8) | 37 (0) | 7 (1) | 99 (8) | 239 (29) | 98 | 6.34 (0.92) | 1.4269 (0.0013) |
| Comp Ex 6 | 4 | 37 (14), 7 (10) | 63 (13) | 39 (0) | 8 (1) | 99 (7) | 239 (55) | 96 | 5.15 (0.34) | 1.4234 (0.0026) |

As shown in Table 8, lenses that were made by photochemical curing exhibited generally reduced wettability as measured by Cahn DCA and Sessile Drop at low levels of the internal wetting agent PVMA as compared to similar lenses made by thermal curing (see Table 6).

Examples 12-14

Reactive monomer mixtures were prepared composed of 77 weight percent of the formulations listed in Table 9, and 23 weight percent of the diluent D3O. The reactive monomer mixtures were individually filtered through a 3 μm filter using a stainless-steel syringe. Then, at the time of use, about 0.0285 grams of AIBN (thermal initiator) were dissolved in 10.0000 grams of RMM. The weight percent of AIBN was about 0.28 weight percent in the final RMM.

The RMM with AIBN was degassed at ambient temperature by applying vacuum (40 torr) for at least 20 minutes. Then, in a glove box with a nitrogen gas atmosphere and less than about 0.1-0.2 percent oxygen gas, about 75 μL of the reactive mixture were dosed using an Eppendorf pipet at room temperature into the FC made of Zeonor. The BC also made of Zeonor was then placed onto the FC. The molds were equilibrated for a minimum of twelve hours in the glove box prior to dosing.

Example 12: Several pallets each containing eight mold assemblies were transferred into an adjacent oven maintained at about 60° C. and located within the glove box, and the lenses were cured under these conditions for about 6 hours.

Example 13: Same procedure except several pallets each containing eight mold assemblies were transferred into an adjacent oven maintained at about 90° C. and located within the glove box, and the lenses were cured under these conditions for about 6 hours.

Example 14: Same procedure except (1) the FC was made from 90:10 (w/w) blend of Z:TT, (2) the BC was made from 90:10 (w/w) blend of Z:PP, and (3) several pallets each containing eight mold assemblies were transferred into an adjacent oven maintained at about 120° C. and located within the glove box, and the lenses were cured under these conditions for about 0.5 hours.

The lenses were manually de-molded and released by suspending the lenses in about one liter of 70 percent IPA for at least 12 hours, followed by soaking two more times with about 450 mL fresh 70 percent IPA for about 45 minutes; then one time with fresh DIW for about 45 minutes; then one time with packing solution for about 45 minutes. The lenses were equilibrated and stored in borate buffered packaging solution prior to autoclaving at 121° C. for 30 minutes in vials.

A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels.

The thermally cured, sterilized lenses of Examples 12-14 as well as sterilized lenses of similar composition but that were photochemically cured (denoted in the figures as comparative example 7 or Comp Ex 7) were analyzed using both transmission and ATR FTIR methods and normalized to the photochemically cured lenses. As shown in FIGS. 1 and 2, the surface concentration of PVP in the thermally cured lenses was higher than the surface concentration of the photochemically cured lenses. In addition, the molar ratio of PVP/silicone in the thermally cured lenses was higher at the surface than in the core.

TABLE 9

| Formulation Components | |
| --- | --- |
| Component (weight %) | Ex 12-14 |
| mPDMS | 31.05 |
| SiMAA | 28.05 |
| DMA | 24.06 |
| HEMA | 5.97 |
| Blue HEMA | 0.20 |
| TEGDMA | 1.65 |
| PVP K90 | 7.00 |
| Norbloc | 2.00 |
| Total | 100 |

Examples 15-17

Example 15: Example 13 was repeated except that (1) the FC was made of 90:10 (w/w) Z:TT, (2) the BC was made of 90:10 (w/w) Z:PP, and (3) lenses were removed at various time points for HPLC-UV analysis of the residual monomers and macromers. The residual component data are listed in Table 10.

Example 16: Example 14 was repeated except that lenses were removed at various time points for HPLC-UV analysis of the residual monomers and macromers. The residual component data are listed in Table 11.

Example 17: Example 14 was duplicated again except that lenses were removed at various time points for HPLC-UV analysis of the residual monomers and macromers. The residual component data are listed in Table 12.

TABLE 10

| Example 15 Residual Monomers - Thermal Cure at 90° C. | | | | | | | |
| --- | --- | --- | --- | --- | --- | --- | --- |
| Cure Time (hours) | [DMA] % | [HEMA] % | [TEGDMA] % | [Norbloc] % | [SiMAA] % | [mPDMS] % | Total % |
| 0.5 | 9.379 | 1.597 | 0.415 | 0.620 | 7.553 | 9.824 | 29.388 |
| 1 | 0.199 | 0.009 | <0.001 | 0.004 | 0.072 | 0.140 | 0.425 |
| 2 | 0.047 | 0.007 | <0.001 | 0.001 | 0.021 | 0.060 | 0.136 |
| 3 | 0.034 | 0.005 | <0.001 | 0.002 | 0.040 | 0.055 | 0.136 |
| 6 | 0.153 | 0.043 | <0.001 | 0.023 | 0.103 | 0.056 | 0.379 |
| 12 | 0.124 | 0.050 | <0.001 | 0.025 | 0.258 | 0.099 | 0.556 |

TABLE 11

Example 16 Residual Monomers - Thermal Cure at 120° C.

| Cure Time (hours) | [DMA] % | [HEMA] % | [TEGDMA] % | [Norbloc] % | [SiMAA] % | [mPDMS] % | Total % |
|---|---|---|---|---|---|---|---|
| 0.17 | 12.955 | 2.889 | 0.646 | 1.038 | 13.150 | 17.977 | 48.656 |
| 0.33 | 0.402 | 0.017 | 0.002 | 0.004 | 0.048 | 0.182 | 0.655 |
| 0.5 | 0.055 | 0.005 | <0.001 | 0.002 | 0.023 | 0.085 | 0.170 |
| 0.5 | 0.065 | 0.003 | <0.001 | 0.009 | 0.026 | 0.095 | 0.198 |
| 1 | 0.064 | 0.013 | <0.001 | 0.007 | 0.014 | 0.100 | 0.198 |
| 2 | 0.048 | 0.014 | 0.001 | 0.008 | 0.059 | 0.161 | 0.292 |
| 6 | 0.029 | 0.013 | 0.008 | 0.011 | 0.340 | 0.313 | 0.713 |
| 12 | 0.024 | 0.014 | 0.012 | 0.013 | 0.476 | 0.492 | 1.031 |

TABLE 12

Example 17 Residual Monomers - Thermal Cure at 120° C.

| Cure Time (hours) | [DMA] % | [HEMA] % | [TEGDMA] % | [Norbloc] % | [SiMAA] % | [mPDMS] % | Total % |
|---|---|---|---|---|---|---|---|
| 0.5 | 0.106 | 0.007 | <0.001 | 0.004 | 0.029 | 0.110 | 0.255 |
| 1.0 | 0.115 | 0.030 | <9.991 | 0.003 | 0.037 | 0.079 | 0.265 |
| 2.0 | 0.051 | 0.028 | 0.004 | 0.004 | 0.203 | 0.108 | 0.398 |
| 6.0 | 0.021 | 0.018 | 0.014 | 0.009 | 1.012 | 0.396 | 1.470 |
| 12.0 | 0.012 | 0.011 | 0.022 | 0.011 | 1.032 | 0.577 | 1.665 |
| 26.0 | 0.002 | 0.004 | 0.011 | 0.016 | 0.275 | 0.782 | 1.090 |

As shown in Tables 10-12, the reactive monomer mixtures thermally cured to high conversion both at 90° C. after about 2 to 3 hours with less than about 0.2 weight percent total unreacted components and at 120° C. after about 0.5 to 1 hour with less than about 0.3 weight percent total unreacted components.

We claim:

1. A method for manufacturing a contact lens, the method comprising:
   (a) providing a reactive mixture comprising a silicone-containing component; a hydrophilic component; a non-reactive polymeric internal wetting agent; and a polymerization initiator; and
   (b) polymerizing the reactive mixture to form the contact lens;
wherein the method is conducted under conditions such that the contact lens has a molar ratio of the polymeric non-reactive internal wetting agent to silicone, without a surface treatment, that is greater in the lens's surface than in its bulk.

2. The method of claim 1 wherein the molar ratio of the polymeric non-reactive internal wetting agent to silicone is at least 1.5 times greater in the lens's surface than in its bulk.

3. The method of claim 1 wherein the molar ratio of the polymeric non-reactive internal wetting agent to silicone is at least 2.3 times greater in the lens's surface than in its bulk.

4. The method of claim 1 wherein the non-reactive polymeric internal wetting agent is a polyamide.

5. The method of claim 1 wherein the non-reactive polymeric internal wetting agent is selected from polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

6. The method of claim 1 wherein, in a lens that is the reaction product of a reactive mixture containing as little as 2.0 weight percent of the non-reactive polymeric internal wetting agent, the lens comprises an advancing contact angle of 75° or less.

7. The method of claim 6 wherein the advancing contact angle is 50° or less.

8. The method of claim 1 wherein step (b) comprises thermally curing the reactive mixture.

9. The method of claim 8 wherein the thermally curing is conducted at a temperature from 60 to 120 degrees Celsius.

10. The method of claim 8 wherein the thermally curing is conducted at a temperature from 85 to 120 degrees Celsius.

11. The method of claim 1 wherein, following step (b) and prior to an extraction step to remove unpolymerized components from the contact lens, the contact lens contains no more than 0.3 weight percent of unpolymerized polymerizable components.

12. A silicone hydrogel contact lens made by the method of claim 1.

* * * * *